US008060822B2

(12) United States Patent
Ishimitsu et al.

(10) Patent No.: US 8,060,822 B2
(45) Date of Patent: Nov. 15, 2011

(54) SYSTEM AND METHOD FOR CREATION OF AN OBJECT WITHIN AN OBJECT HIERARCHY STRUCTURE

(75) Inventors: Michael Kazuo Ishimitsu, Sammamish, WA (US); Giovanni Stallo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 11/856,315

(22) Filed: Sep. 17, 2007

(65) Prior Publication Data

US 2009/0164939 A1 Jun. 25, 2009

Related U.S. Application Data

(62) Division of application No. 10/411,576, filed on Apr. 10, 2003, now Pat. No. 7,272,818.

(51) Int. Cl.
G06F 3/00 (2006.01)
(52) U.S. Cl. ......... 715/713; 715/805; 715/853; 715/854
(58) Field of Classification Search .................. 715/713, 715/805, 853, 854
See application file for complete search history.

(56) References Cited

U.S. PATENT DOCUMENTS

| | | |
|---|---|---|
| 4,821,211 A | 4/1989 | Torres |
| 5,537,630 A | 7/1996 | Berry et al. |
| 5,546,521 A | 8/1996 | Martinez |
| 5,550,967 A | 8/1996 | Brewer et al. |
| 5,574,908 A | 11/1996 | Harding et al. |
| 5,630,131 A | 5/1997 | Palevich et al. |
| 5,632,031 A | 5/1997 | Velissaropoulos et al. |
| 5,642,511 A | 6/1997 | Chow et al. |
| 5,659,727 A | 8/1997 | Velissaropoulos et al. |
| 5,664,181 A | 9/1997 | Velissaropoulos et al. |
| 5,687,365 A | 11/1997 | Velissaropoulos et al. |
| 5,701,472 A | 12/1997 | Koerber et al. |
| 5,721,895 A | 2/1998 | Velissaropoulos et al. |
| 5,727,174 A | 3/1998 | Aparicio, IV et al. |
| 5,742,836 A | 4/1998 | Turpin et al. |
| 5,745,712 A | 4/1998 | Turpin et al. |

(Continued)

OTHER PUBLICATIONS

Forte Display Library Release 3 of the Forte Application Environment, Forte Software Inc., 1997, pp. 535-550.

(Continued)

*Primary Examiner* — Doon Chow
*Assistant Examiner* — Shen (Connie) Shiau
(74) *Attorney, Agent, or Firm* — Workman Nydegger

(57) ABSTRACT

A system and method relating to creation of object(s) in an object hierarchy structure is provided. An object generator that in response to a command to expand a node/object provides a initiator node that facilitates generation of a new object within the object hierarchy upon expansion of the node. A display component concurrently displays the initiator node with the expanded node. The initiator node used for creating objects placed (e.g., in-line) within an object hierarchy structure. To create a new object, an instruction (e.g., user input) to expand a node having a initiator node is received. By selecting the initiator node and entering a name, an object of type defined by the initiator node is created. For example, once the object is created the user can enter information defining parameter(s) of the object. Information can be entered through a user interface box (e.g., text box) that is displayed upon the creation of the object. Also, a grid can overlay the object hierarchy structure allowing information to be entered directly into grid cell(s). The grid can further be employed to display defined parameter(s).

23 Claims, 14 Drawing Sheets

U.S. PATENT DOCUMENTS

| | | | |
|---|---|---|---|
| 5,745,901 A * | 4/1998 | Entner et al. ............................ | 1/1 |
| 5,748,186 A | 5/1998 | Raman | |
| 5,778,223 A | 7/1998 | Velissaropoulos et al. | |
| 5,907,704 A | 5/1999 | Gudmundson et al. | |
| 5,970,494 A | 10/1999 | Velissaropoulos et al. | |
| 5,987,247 A | 11/1999 | Lau | |
| 5,995,940 A * | 11/1999 | Ramaley ............................ | 705/9 |
| 6,003,040 A | 12/1999 | Mital et al. | |
| 6,014,138 A | 1/2000 | Cain et al. | |
| 6,025,828 A | 2/2000 | Berry et al. | |
| 6,028,602 A | 2/2000 | Weidenfeller et al. | |
| 6,029,170 A | 2/2000 | Garger et al. | |
| 6,055,515 A | 4/2000 | Consentino et al. | |
| 6,078,327 A | 6/2000 | Liman et al. | |
| 6,111,579 A | 8/2000 | Alimpich et al. | |
| 6,119,122 A * | 9/2000 | Bunnell ............................ | 1/1 |
| 6,151,024 A | 11/2000 | Alimpich et al. | |
| 6,275,979 B1 | 8/2001 | Graser et al. | |
| 6,281,896 B1 | 8/2001 | Alimpich et al. | |
| 6,353,923 B1 | 3/2002 | Bogle et al. | |
| 6,360,332 B1 * | 3/2002 | Weinberg et al. ............... | 714/4 |
| 6,408,311 B1 | 6/2002 | Baisley et al. | |
| 6,446,077 B2 | 9/2002 | Straube et al. | |
| 6,446,098 B1 | 9/2002 | Iyer et al. | |
| 6,502,233 B1 | 12/2002 | Vaidyanathan et al. | |
| 6,513,152 B1 | 1/2003 | Branson et al. | |
| 6,526,455 B1 | 2/2003 | Kamimura | |
| 6,532,471 B1 | 3/2003 | Ku et al. | |
| 6,542,912 B2 | 4/2003 | Meltzer et al. | |
| 6,559,871 B1 | 5/2003 | Brozowski et al. | |
| 6,569,208 B2 | 5/2003 | Iyer et al. | |
| 6,654,759 B1 | 11/2003 | Brunet et al. | |
| 6,681,370 B2 | 1/2004 | Gounares et al. | |
| 6,732,353 B1 | 5/2004 | Bloom et al. | |
| 6,769,113 B1 | 7/2004 | Bloom et al. | |
| 6,810,429 B1 | 10/2004 | Walsh et al. | |
| 6,814,842 B1 | 11/2004 | Yago et al. | |
| 6,816,175 B1 | 11/2004 | Hamp et al. | |
| 6,826,443 B2 | 11/2004 | Makinen | |
| 6,826,568 B2 | 11/2004 | Bernstein et al. | |
| 6,851,089 B1 | 2/2005 | Erickson et al. | |
| 6,868,412 B2 | 3/2005 | Gatehouse et al. | |
| 6,941,524 B2 | 9/2005 | Lee et al. | |
| 6,944,818 B2 | 9/2005 | Newman et al. | |
| 6,965,390 B2 | 11/2005 | Alimpich et al. | |
| 6,976,212 B2 | 12/2005 | Newman et al. | |
| 7,036,072 B1 | 4/2006 | Sulistio et al. | |
| 7,047,226 B2 | 5/2006 | Rubin | |
| 7,047,488 B2 | 5/2006 | Ingersoll et al. | |
| 7,076,766 B2 | 7/2006 | Wirts et al. | |
| 7,117,449 B1 | 10/2006 | Levin et al. | |
| 7,124,179 B1 | 10/2006 | Bauer et al. | |
| 7,456,840 B2 * | 11/2008 | Molesky et al. ............... | 345/581 |
| 2002/0057269 A1 * | 5/2002 | Barber et al. .................. | 345/418 |
| 2006/0080622 A1 * | 4/2006 | Stuart ............................ | 715/853 |
| 2008/0052623 A1 * | 2/2008 | Gutfleisch ..................... | 715/713 |

OTHER PUBLICATIONS

Mastering Microsoft Office 97 Professional Edition, Lonnie E Mosley, et al., 1997, pp. 307-308, 587-588.

Java Look and Feel Design Guidelines Advanced Topics, 2001, pp. 152-154.

Template Software Workflow Template Version 8.0, Using the WFT Development Environment, 1998, Print, Release 1997, Whole Manual.

Visual Basic 6 Unleashed The Comprehensive Solution, Rob Thayer, SAMS, Sep. 11, 1998, pp. 49-62.

Flip Korn, A Taxonomy of Browsing Methods: Approaches to the 'Lost in Concept Space' Problem, University of Maryland, Dept. of Computer Science Techincal Report, 1996.

European Search Reprot Dated Jan. 3, 2006, Mailed Mar. 7, 2006 for European Application Ser. No. 04007962, 3 Pages.

"Drop-Down Drop-Out Combo Box to Specify a Tree Node" IBM Technical Disclosure Bulletin (Jul. 1, 1994) 1 Page.

Forte Display Library Release 3 of the Forte application Environment, Forte Software Inc., 1997, pp. 535-550.

Mastering Microsoft Office 97 Professional Edition, Lonnie E. Moseley, et al., 1997, pp. 307-308, 587-588.

JAVA Look and Feel Design Guidelines Advanced Topics, 2001, pp. 152-154.

Template Software Workflow Template version 8.0, Using the WFT Development Environment, 1998, print, release 1997, Whole manual.

Visual Basic 6 Unleashed The Comprehensive Solution, Rob thayer, SAMS, Sep. 11, 1998, pp. 49-62.

Flip Korn. A Taxonomy of Browsing Methods: Approaches to the 'Lost in Concept Space' Problem. University of Maryland, Dept. of Computer Science Technical Report, 1996.

European Search Report dated Jan. 3, 2006, mailed Mar. 7, 2006 for European Application Ser. No. 04007962, 3 pages.

"Drop-Down Droup-Out Combo Box to Specifiy a Tree Node" IBM Technical Disclosure Bulletin (Jul. 1, 1994) 1 page.

\* cited by examiner

SYSTEM AND METHOD FOR CREATION OF AN OBJECT WITHIN AN OBJECT HIERARCHY STRUCTURE

CROSS REFERENCE TO RELATED APPLICATIONS

This application is a divisional of U.S. patent application Ser. No. 10/411,576, filed on Apr. 10, 2003, entitled "SYSTEM AND METHOD FOR CREATION OF AN OBJECT WITHIN AN OBJECT HIERARCHY STRUCTURE", the entirety of which is incorporated herein by reference.

TECHNICAL FIELD

The present invention generally relates to creation of object(s) in a computer system. In particular, the present invention relates to a system and method for the creation of object(s) within an object hierarchy structure.

BACKGROUND OF THE INVENTION

An object hierarchy structure, such as a computer tree, allows a user to quickly navigate through the hierarchy structure. Object hierarchies generally include parent node(s), which can be expanded, and child node(s) (e.g., that represent or map to real-world object(s)) that can be found within those parent nodes. A user can expand a parent node to view the contents of that node, or compress a parent node when the contents of the parent node are no longer need be visible. The nodes can correspond to objects of a variety of data types as well as application types. For example, base nodes as well as child nodes correspond to file or application directories, and the contents therein can be documents, media, applications etc.

Increasing advances in computer technology (e.g., microprocessor speed, memory capacity, data transfer bandwidth, software functionality . . . ) have significantly contributed to making the world a smaller place as well as increase global competition. More particularly, businesses and individuals of today produce and manage much more work product than counterparts of several years prior. Individuals often multitask numerous items (e.g., documents, spreadsheets, statements, presentations, media . . . ) as well as applications that facilitate managing and working with such items. As such, various software-based tools have been developed to aid user(s) with multi-tasking. One very powerful tool is a file management system, which allows users to quickly view and access directories and respective content. For example, a file management system can present directories and/or contents via a tree-based hierarchy (e.g., object hierarchy)—this is a very logical and user intuitive scheme for presentation of information associated with file management. However, file management systems are merely one example of numerous instances in which object hierarchy structures are useful to present information to user(s) and/or facilitate manipulation of information associated with object(s) of the hierarchy structure.

Creating a new object within an object hierarchy, however, has historically been a counterintuitive process. For example, in order to create a new object under a parent node, a user typically used a mouse right-clicked on the parent node and then navigated through several menus in order to select the desired object type (e.g., message, variable, port, etc.). Alternatively, after selecting a parent node, the user navigated through several options from the main menu in order to select the desired object type. Other techniques for ascertaining functionality include employing a right-click menu, a toolbar, and associated modeless tool windows such as a properties window. Although highly useful, such conventional object hierarchy scheme has not kept pace with the ever increasing demands placed on computer users to work faster and concurrently handle greater amounts of file and application types. Discoverability of how to perform an operation has often times been a confusing and daunting task for user(s). Conventionally, user(s) have been required to go through numerous steps (e.g., opening up a directory/node to view contents, accessing files therein, launching tertiary applications associated with respective files to effect various functionality . . . ) in order to accomplish a desired result. This has been overburdening to the user. Accordingly, an improved system and methodology to facilitate computer-based object management and manipulation is highly desired.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the invention provides for a user to create node(s) which represent objects (e.g., directories, files, applications, media, data structures, functionalities . . . ) and respective hierarchy associated therewith. More particularly, the invention allows for a user to select/expand an object/node and view sub-objects as well as creating new object(s) and assigning functionalities to the objects (old and/or new) within the expanded node/object, and/or viewing operation(s) that can be performed on the parent node, such as creating a new child node, configuring the parent node, etc. The functionalities can be predefined and/or user defined and/or dynamically determined based on context and type of task and object as well as user state. Thus, the subject invention provides a user with significantly more flexibility and functionality in connection with managing and using various objects as compared to conventional object management/manipulation tools. The invention mitigates the number of steps required to effect desired functionality in connection with an object and/or learning about functionality that an object supports, such as the ability to create sub-objects, a very common hierarchy operation.

Regarding creation of new objects within a programming setting for example, the subject invention allows for a user to create a new object in-line with a tree-grid object hierarchy interface. More particularly, the invention allows for a user, to expand a node within a tree-grid and a node (e.g., initiator node) that facilitates generation of the new object is automatically displayed in the expanded node. The initiator node provides tools that facilitate, for example, creation of the new object within that node. For example, the initiator node can provide visual cues directly in the tree view to create particular nodes. The initiator node can initially contain text which describes an action that will happen when the user clicks on the node and types.

To create a new object, an instruction (e.g., user input) to expand a node having a initiator node is received. By selecting the initiator node and entering a name, an object of type defined by the initiator node is created. Once the object is created the user may enter information defining parameter(s) of the object. Information can be entered through a user interface box (e.g., text box or combo box (e.g., that provides option(s) for the parameter)) that is displayed upon the creation of the object. If an object created by a initiator node is invalid (e.g., the parameter(s) defining the object contain insufficient or invalid information) error information (e.g., a flag and/or signal) can be displayed (e.g., on the object) to inform the user that the object is invalid. Further, upon hovering over or selecting the error information and/or the object, help text can be displayed which informs the user on how to validate the object. Thus, the initiator node essentially effects placing "New <object>" menu item(s) directly in the tree coupled with an immediate ability to set the object's name and other properties.

With respect to another particular aspect of the invention, the initiator node can be employed to provide various functionalities associated with a particular object (e.g., directory or contents of a directory). For example, if the object is a Word document and a user typically performs functions such as save, delete, copy, paste, send via e-mail, print . . . in connection with that object type, the invention provides for making available such functionalities (to the user within the tree grid environment) vis a vis the particular object. It is to be appreciated that various objects can have sub-objects displayed in accordance with the subject invention. Moreover, different object types can have associated therewith different functionalities and/or sub-objects.

Also, a grid can overlay the object hierarchy structure allowing information to be entered directly into grid cell(s). The grid can further be employed to display defined parameter(s). More particularly, the invention provides for a new user interface in tree control grids that reduce context switching as compared to conventional tree control grids which often distracts the user from their task. Tree controls have been combined with grid controls to display hierarchical information next to or in conjunction with a grid containing property values or other information. Tree controls have been combined with grid controls in the past, but they have either been too busy in appearance or too sparse to properly convey which text cells were on the same row. Horizontal grid lines criss-crossed with vertical tree lines producing a distracting amount of information for the user to needlessly visually sort through. In other cases, the lack of horizontal grid lines made it more difficult to see which node was associated with which cell. Additionally, such controls lacked certain refinements which substantially increase usability in situations where the purpose of the tree/grid control is to create new child nodes of various types. In accordance with one exemplary aspect of the subject invention, the grid and the object hierarchy structure are distinctly separate to avoid visual clutter.

Yet another aspect of the present invention provides for a user interface which can serve as a dynamic modeless wizard that is in-line within an object hierarchy. A "wizard" in the sense that it is a process that is initiated, guides the user and collects data for the operation, executes zero or more sub-operations (work items), and has a finish point; "modeless" in that the user can modify one parameter value but not the others and come back at a later time; "dynamic" in that the steps to take (e.g., the work items to perform) to complete the entire operation are automatically generated; "in-line" in that you don't have to do any context switching to some other user interface like a separate dialog box or nearby modeless tool window.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
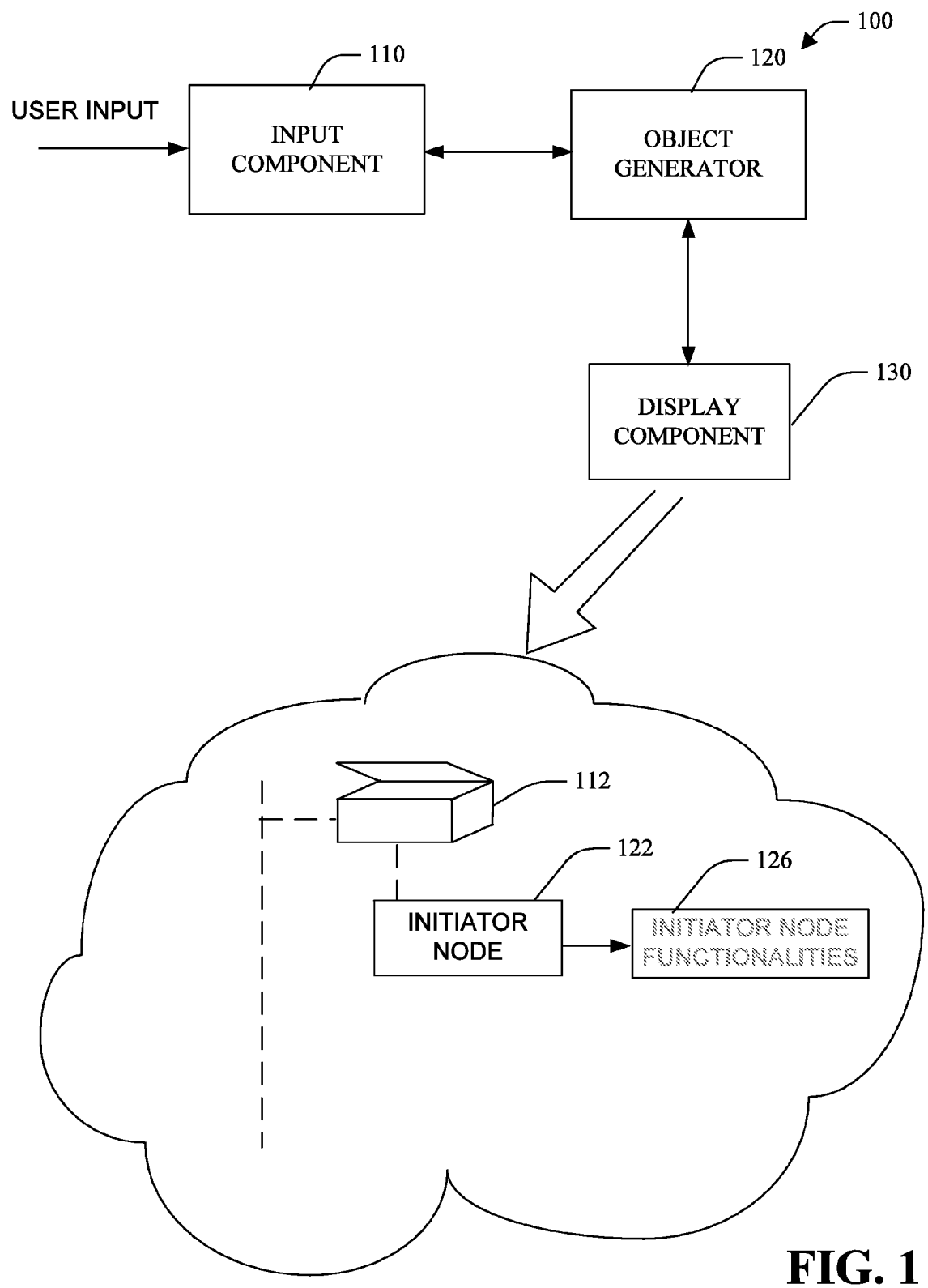
FIG. 1 is a block diagram of an object hierarchy structure system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The subject invention can incorporate various inference schemes and/or techniques in connection with effecting a user interface for object management and manipulation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

FIG. 1 illustrates a high-level system overview in connection with one particular aspect of the invention. The subject invention relates to a novel display and object management system and methodology. An object hierarchy structure system 100 in accordance with an aspect of the present invention is illustrated. An input component 110 receives instructions, for example, from a user of other computing component. The input component 110 can include a computer keyboard, mouse and/or pointing device(s). The input component 120 can receive information from the user, for example, selection of a initiator node, object name and/or object parameter(s). In response to an instruction to expand a node 112 (e.g., a directory) an object component 120 generates an initiator node 122 which is displayed concurrently with the expanded node 112 via a display component 130.

It is to be appreciated that the generation of the initiator node 122 can be automatic upon expanding a node or require user action depending upon particular preferences. For example, it can be appreciated that after a node has been populated with desired objects via employment of the initiator node 122, continuous display of the initiator node may be unnecessary as well as undesired for mature well defined nodes. More particularly, initiator nodes are extremely useful in connection with new nodes and generation of objects associated therewith; and as nodes become better defined over time the initiator node may be employed less often as compared to functionalities associated with the node and objects therein. Thus, the invention can provide the user with the option of deactivating display of the initiator node with respect to particular nodes.

The object generator 120 thus can provide the initiator node 122 to the object hierarchy structure upon expansion of the node 112. The object generator 120 further generates an object of the object hierarchy structure based, at least in part, upon the initiator node 112 and input information (e.g., object name and/or object parameter(s)) subsequently provided by a user, for example, after the initiator node 122 has been formed. For example, the generated object can include a message, a port, a variable, a correlation and/or a service link. Additionally, the object generator 120 can provide error information, if input information received via the input component 110 is invalid. Thus, the initiator node 122 can facilitate initiation of operation(s), for example, creation of new port(s) and/or configuration of port(s). For example, the initiator node 122 can operates against a parent node and not sibling node(s).

In one example, when an object is created or attempted to be created, but is invalid, error information (e.g., a flag and/or signal) is displayed informing the user that the object is invalid. The error information can comprise, for example, a visual flag, an audio flag, or any suitable indication that advises the user that the object is invalid. Further, upon hovering over or selecting the error information and/or the object, help text can be displayed which informs the user on how to validate the object. For example, the help text can provide information associated with associated parameter(s) and/or valid value(s) for parameter(s).

More particularly, the system 100 allows for a user to select the node 112 (e.g., via a computer mouse) and view the initiator node 122 to effect generation of new object(s) as well as effect various functionalities to employ in connection with the object(s) that are part of the node 112. The functionalities can be predefined and/or user defined and/or dynamically determined based on context and type of task and object as well as user state. Thus, the subject invention provides a user with significantly more flexibility and functionality in connection with managing, creating and using various objects as compared to conventional object management/manipulation tools.

With respect another particular aspect of the invention, the initiator node can be employed to provide various functionalities associated with a particular object (e.g., directory or contents of a directory). For example, if the object is a Word document and a user typically performs functions such as save, delete, copy, paste, send via e-mail, print . . . in connection with that object type, the invention provides for making available such functionalities (to the user within the tree grid environment) vis a vis the particular object. It is to be appreciated that various objects can have sub-objects displayed in accordance with the subject invention. Moreover, different object types can have associated therewith different functionalities and/or sub-objects.

It is to be appreciated that various nodes/objects have particular attributes associated therewith, and that typically within an object hierarchy like nodes/objects can have a correlation based upon level thereof within the hierarchy as well as proximity within a hierarchy and/or relationship to parent node(s). Thus, the system 100 can employ artificial intelligence to invoke a initiator node with inferred functionalities based at least in part upon identifying properties and/or attributes of the expanded node. More particularly, the object generator 120 can create a creator node having functionality that the system determines to be most appropriate for the particular type of expanded node.

Another aspect of the invention allows for the system 100 to allow a user to transport and/or define creator node functionality (e.g., customize which creator node(s) are visible) to particular node/object types so as to minimize recreation of object types as well as provide the user with desired functionality based upon the node/object types. For example, if the node corresponds to a text file, the generated creator node would provide functionality typically associated with a text file as compared to creating a new object type relating to a programming model.

Moreover, the system 100 can employ explicitly trained as well as implicitly trained classifiers in connection with inferring desired functionalities to expose to a user upon expanding a node. For example, the system can be implicitly trained by watching a user over time to learn how the user likes to work with particular node/object types and thus automatically provide such functionality to the user based upon the training. The system 100 can employ a utility-based analysis wherein the cost of displaying incorrect initiator node functionality can be factored against the benefits of displaying correct initiator node functionality in connection with a particular user and computing context/state.

Figure 2:
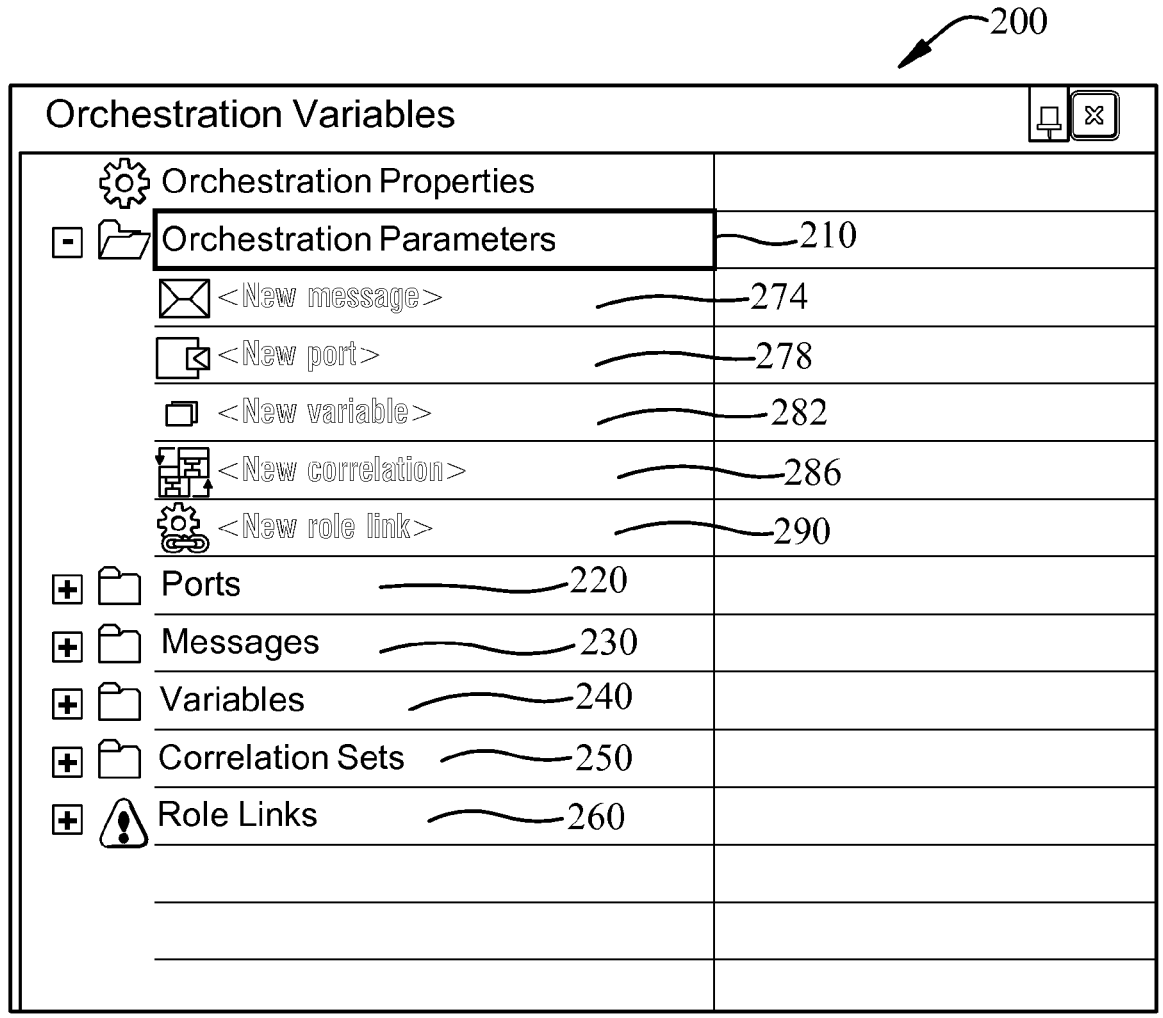
FIG. 2 is a diagram of an exemplary object hierarchy structure in accordance with an aspect of the present invention.

Turning now to FIG. 2, an exemplary object hierarchy structure 200 in accordance with an aspect of the present invention is illustrated. The structure 200 depicts a subset of nodes that are part of a tree-grid in accordance with the invention. The subset of nodes includes an orchestration parameters node 210, a ports node 220, a messages node 230, a variables node 240 a correlation sets node 250 and a role links node 260. These nodes are merely exemplary and it is to be appreciated that substantially any type of nodes/objects can be part of the tree grid. The nodes 210, 220, 230, 240, 250 260 are expandable as they include child node(s). Expandability is denoted in the exemplary structure 200 by the "+" sign to the left of a folder symbol. Nodes that are currently expanded can be identified with a "−" sign as is the case with respect to node 210 which relates to orchestration parameters. The orchestration parameters node 210 has been expanded to depict a new message initiator node 274, a new port initiator node 278, a new variable initiator node 282, a new correlation initiator node 286 and a new role link initiator node 290. As shown, text accompanying the initiator nodes 274, 278, 282, 286, 290, for example, can be lighter than other portion(s) of the structure 200 (e.g., ghosting effect). The initiator node can be employed to create an object of a particular type (e.g., message, variable, port, folder and/or link). By placing the initiator node substantially in-line within the object hierarchy structure, a user can intuitively create object(s) without navigating through several menus. Further, object(s) can be created by the user without having to possess the knowledge about how to create objects. By having it in-line, it is discoverable by the user. An object is generated (e.g., by the object generator 130) upon selection of the initiator node and input information from the user (e.g., object name and/or object parameter(s)). Typically, parameter value(s) that are received from a user are used for a sub-operation or for the operation as a whole.

For example, the initiator node can be selected by mouse, keystroke(s), program and/or any other suitable means of selecting. By selecting the new message initiator node 274, a user can enter a name for a new message object associated with the orchestration node. Thereafter, a message object having the name entered by the user is created.

It is to be appreciated that the various initiator nodes can generate objects and/or functionalities that are part of the respective expanded node and/or become part of another node. For example, if the new port initiator node 278 generated a new port, such new port could reside within the orchestration parameter node 210 and/or be part of the port node 220 for example. The generated objects can be part of a relational scheme and thus a single object can be associated with multiple classes of other objects. Although not shown in this figure, in addition to the initiator nodes be displayed, various functions (e.g., cut, copy, merge, paste, save, delete, send . . . ) can be displayed for example via a pop-up menu upon the node being expanded. It is to be appreciated that the initiator nodes can provide for designating certain functionalities to be associated with the node upon expansion as well as when the node is not expanded (e.g., when a cursor is moved over the node, the contents can be displayed as well as functionalities displayed that can be effected on the node and/or contents therein without having to expand the node).

The subject invention also provides for an improved display technique in connection with displaying an object hierarchy. As shown with respect to FIG. 2, the tree control in accordance with the subject invention reduces context switching (which often distracts the user from their task) via selective employment of grid lines. In conventional grid displays, horizontal grid lines criss-crossed with vertical tree lines which produced a distracting amount of information for the user to needlessly to visually sort through. In other cases, the lack of horizontal grid lines made it more difficult to see which node was associated with which cell. Additionally, such controls lacked certain refinements which substantially increase usability in situations where the purpose of the tree/grid control is to create new child nodes of various types.

In accordance with the subject invention, base nodes (e.g., nodes appearing to a left section of the grid) do not have grid lines associated therewith—grid lines (horizontal and vertical) initiate at the beginning of text corresponding to nodes and/or objects as compared to the folders and "+" or "−" signs as in conventional systems. Vertical grid lines initiate to the right of nodes/objects and/or creator objects. The grid lines can be effected so that the grid overlay does not encompass the entire object hierarchy structure. Alternatively, the grid overlay can be designed to encompass substantially the entire object hierarchy structure in accordance with user preference.

It is to be appreciated that the grid lines can be of a light color in order to reduce visual clutter while still guiding a user's vision from the node to its associated cells. Likewise, the lines (or a subset thereof, for example, vertical lines) can be made invisible in order to mitigate visual clutter. The information within respective grid cells can then be horizontally separated by a space (e.g., uniform) in order for the user to differentiate between information in adjacent cells. The cells of grid overlay can display information relevant to the node from which the horizontal line extends.

The selective placement of grid lines in accordance with the subject invention mitigates cluttering of objects and accentuates objects so as to provide for a highly user intuitive and effective display scheme.

Figure 3:
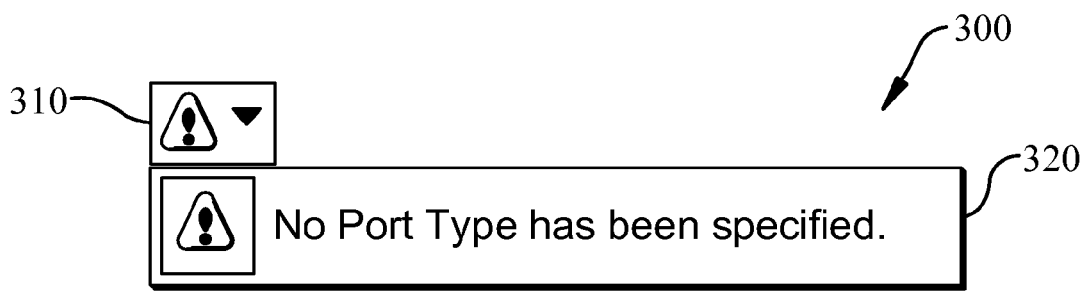
FIG. 3 is a diagram of a user interface in accordance with an aspect of the present invention.

Turning briefly to FIG. 3, a user interface 300 in accordance with an aspect of the present invention is illustrated. The user interface 300 includes a signal 310 and a help box

320. By selecting or hovering over the signal 310, the help box 320 is displayed informing the user how to validate the object. In one example, the object is a variable, and a user failed to define the variable type (e.g., float, integer, pointer, . . . ). By hovering a pointer over the signal 310, the help box 320 is displayed informing the user of how to validate the object. If more than one parameter of the object contains insufficient or invalid information, the help box 320 can describe how to validate one or more invalid parameter, and thus describe how to validate the object. In other examples, the help text can be displayed upon hovering over the object with a pointer, selecting the object through mouse, keyboard strokes, program, or any other means of selecting an object, by hovering a pointer over the object, or by selecting the signal 310 (e.g., not simply hovering over the signal 310). For example, by selecting one of the guidance option(s) of the help box 320 (e.g., smart tag's dropdown) can start an associated process.

In one example, the generated object is represented in the same node of the object hierarchy structure as the initiator node. In another example, the generated object is represented in a different of the object hierarchy structure than the initiator node.

Figure 4:
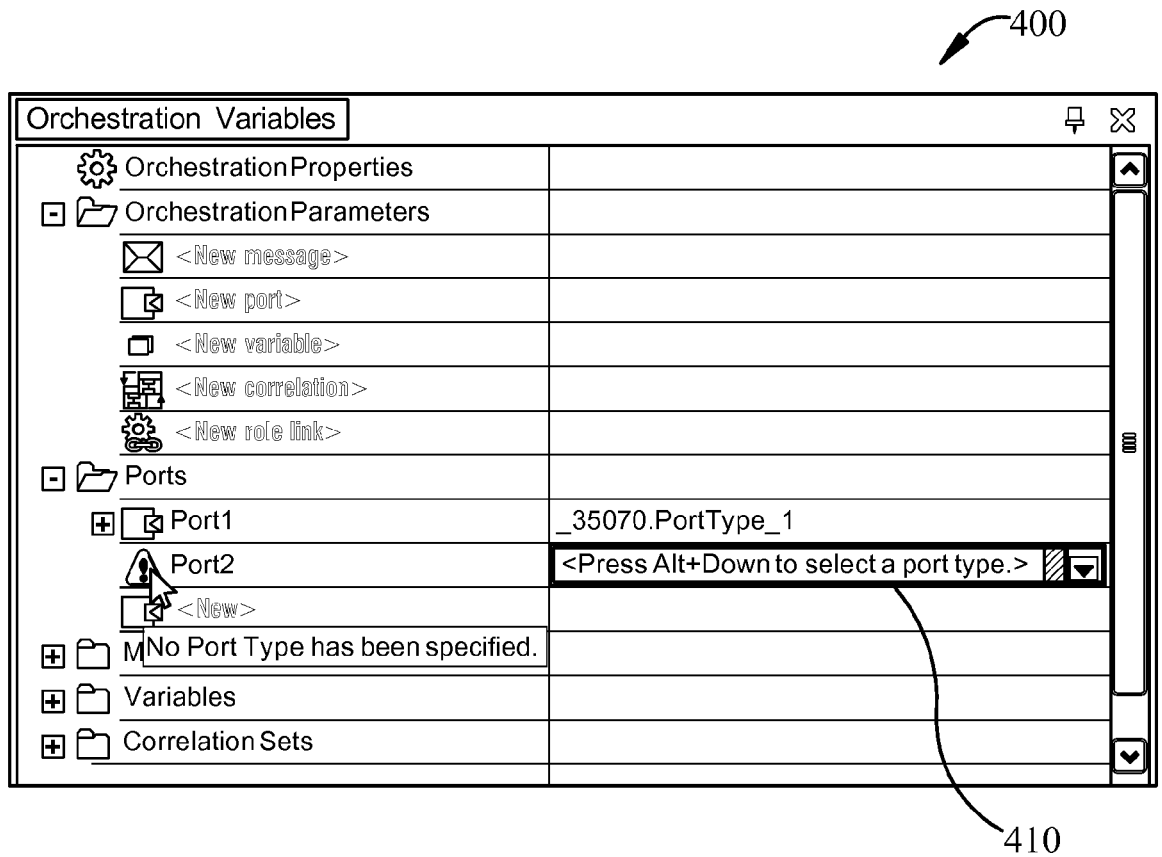
FIG. 4 is a diagram of an exemplary user interface in accordance with an aspect of the present invention.

Turning to FIG. 4, an exemplary user interface 400 in accordance with an aspect of the present invention is illustrated. Upon selection of a initiator node, a user interface box 410 is displayed (e.g., via display component 130). The user interface box 410 facilitates receipt of information defining an object to be generated (e.g., object name and/or object parameter(s)) and/or collecting further parameter(s) for the operation. For example, to fully create a variable, a valid variable name and a valid variable type must be supplied. For example, optionally, if there was a third column in the grid, a default value for the variable could be supplied. The user interface box 410 facilitates user entry of information associated with an object to be generated (e.g., by the object generator 130), and can have one or more text positions in which a user can enter information that defines the object to be generated.

In one example, the user interface box 410 can also include an "OK" button to finalize the creation of the new object and/or a "CANCEL" button to cancel the creation of the new object. The new object can also be finalized by tabbing through substantially all of the text positions in the user interface box 410, by entering information into each text position, through various keystrokes, or any other means. In another example, a drop-down combo-box appears. The contents of the drop-down combo-box correlate to a text position whose content(s) are being entered or altered. For instance, if the object to be created is a variable, and if text is being entered into a text position marked "TYPE", the drop-down combo-box can provide help text (e.g., option(s) and/or superset of option(s) assisting the user in selecting a variable type. Each cell does not have to be populated after the user has initiated the operation, as a user may desire to leave one or more cell(s) empty in order to enter content at a later time. Thus, the user can come back at a later time to fully complete the operation—the interim work is not lost. Upon finalization of the operation, the user can create another object using the initiator node.

For example, a drop-down combo-box can be displayed upon a user selecting a cell in order to assist the user in choosing a valid parameter value for the operation. Upon pulling down the drop-down combo-box, the user can access help-text for various parameters of the object. In another example, the drop-down combo-box contains help text relating to the cell in which information is being entered. Upon pulling down the drop-down combo-box, help text can be displayed which can assist the user as to where to enter information on the grid (e.g., option(s) for the user or the ability to construct the value for the cell.).

Additionally, the drop-down combo-box can provide option(s) for a given parameter (e.g., cell) and/or provide the ability to construct a parameter value. For example, a drop-down combo-box can display a list box and/or a dialog box with several controls in it.

The use of a drop-down combo-box is an improvement over conventional systems as a strict sequence for validating an object is not required. Unlike a creation wizard, a user can enter information defining parameter(s) in any sequence, while still obtaining help with the creation of the object.

Figure 5:
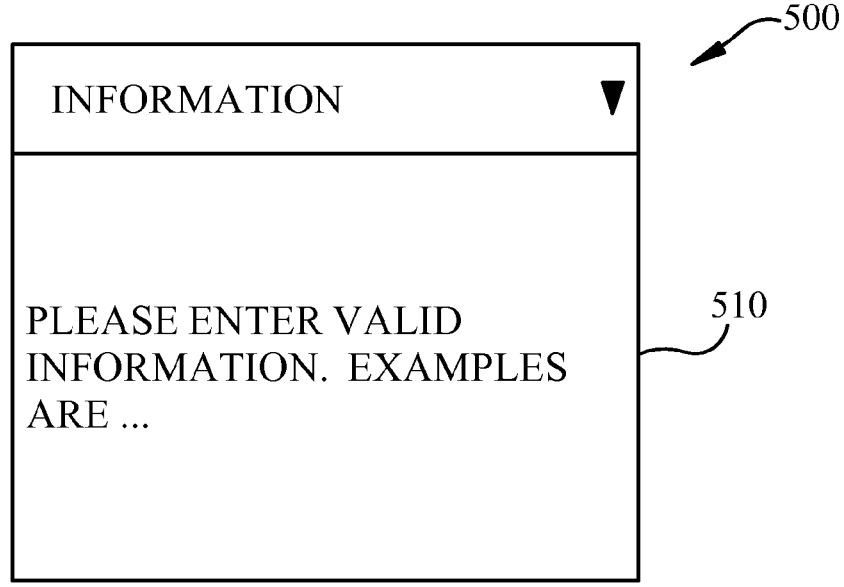
FIG. 5 is a diagram of an exemplary expanded drop-down combo-box in accordance with an aspect of the present invention.

Referring briefly to FIG. 5, an exemplary expanded drop-down combo-box 500 in accordance with an aspect of the present invention is illustrated. The expanded area 510 provides additional information to facilitate user entry of information associated with object generation.

Figure 6:
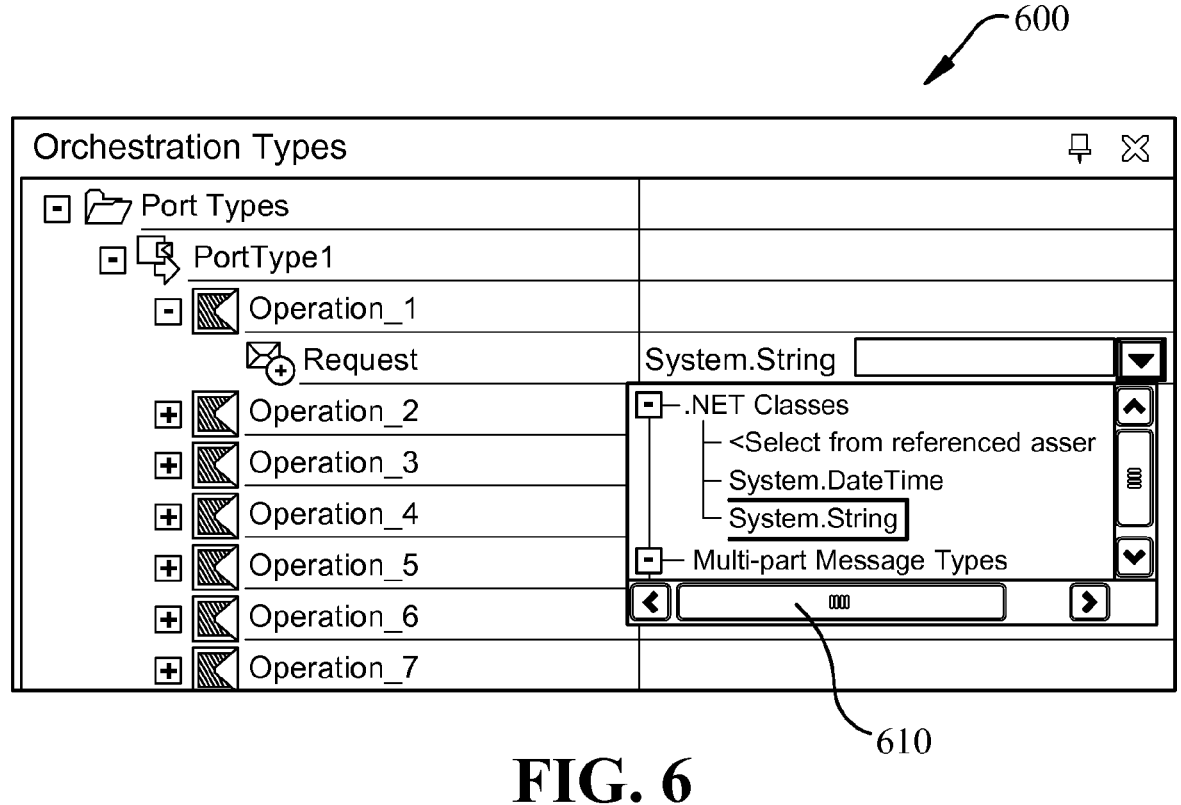
FIG. 6 is a diagram of an exemplary user interface in accordance with an aspect of the present invention.

Next, turning to FIG. 6, an exemplary user interface 600 in accordance with an aspect of the present invention is illustrated. The user interface 600 includes a drop-down combo box 610 that facilitates user entry of information and/or communication of information to the user (e.g., display via the display component 110). For example, details regarding employment of an object and/or functionality can be bi-directionally conveyed by the user and system 100.

Figure 7:
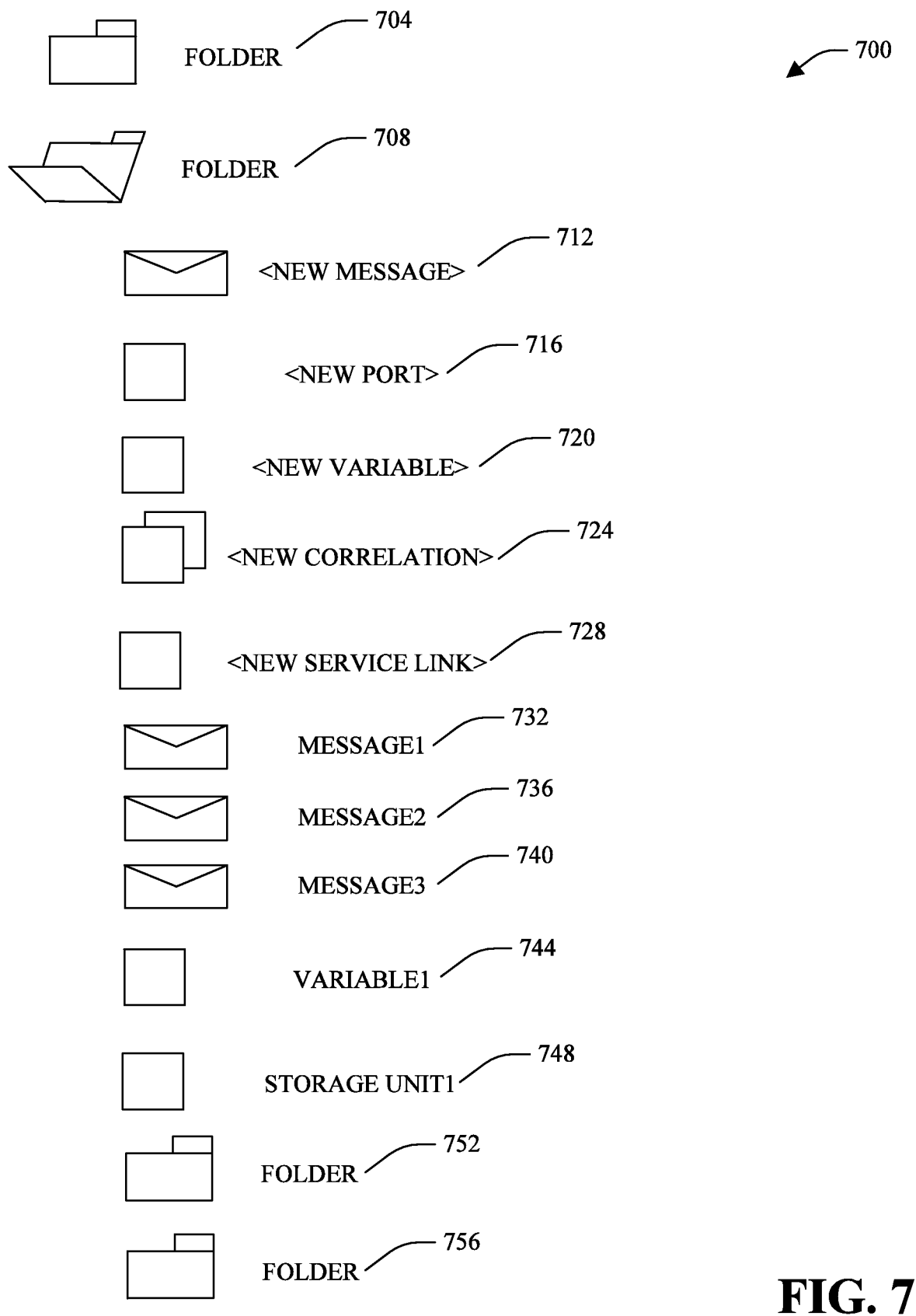
FIG. 7 is a diagram of an exemplary object hierarchy structure in accordance with an aspect of the present invention.

Turning to FIG. 7, an exemplary object hierarchy structure 700 in accordance with an aspect of the present invention is illustrated. The object hierarchy structure 700 includes two parent nodes, compressed folder 704 and expanded folder 708. The expanded folder 708 includes several initiator nodes; a message initiator node 712, a port initiator node 716, a variable initiator node 720, a correlation initiator node 724, and a service link initiator node 728. Expanded folder 708 also includes several object types (e.g., created through the use of the initiator nodes), message 1 732, message2 736, message3 740, variable1 744 and storage unit1 748. The expanded folder 708 further includes child folders 752, 756.

Text can be displayed near a initiator node in order to inform the user of what object or file type the initiator node will create. In one example, in order to avoid possible user confusion, the text is not able to be edited by the user. The initiator nodes also can have distinguishable icons to further inform the user of what object type the initiator nodes will create. The types of initiator nodes within any given parent node can also be defined by a user. The user can further define properties of the expanded folder 708 facilitating identification of initiator node(s) to be displayed. Thus, the subject invention can provide for concurrently displaying nodes/objects including initiator nodes as well as functions available to execute on the nodes/objects.

Figure 8:
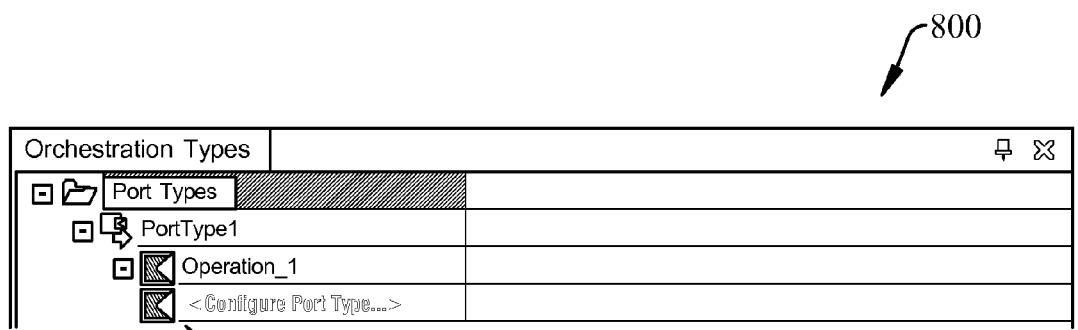
FIG. 8 is an exemplary user interface in accordance with an aspect of the present invention.

Referring to FIG. 8, an exemplary user interface 800 facilitating object manipulation in accordance with an aspect of the present invention is illustrated. The user interface 800 facilitates manipulation of object(s). In this example, object "Port-Type1" can be manipulated by a <Configure Port Type . . . > field 810. Thus, concurrent with displaying contents of a folder, option(s) related to manipulation of the contents can be displayed. Thus, for example, if the object is a bitmap image, options such as for example, copy, send via e-mail, print, change format, compress, save, delete . . . can be displayed upon expanding a node containing the object. Alternatively, such functionality can be displayed via pop-up menu when hovering over the object. As noted above, various AI schemes can be employed to infer a particular action that the user may desire to perform on the node or object, and have such action(s) automatically made available to the user. Various factors such as age of the object, prior history of use in connection therewith, time of day, user state, location of user, location of computer access, tertiary applications being concurrently employed etc. can be considered in connection with the inferences. As noted supra, a utility analysis can be performed in connection with a confidence threshold to take or make available particular actions.

Figure 9:
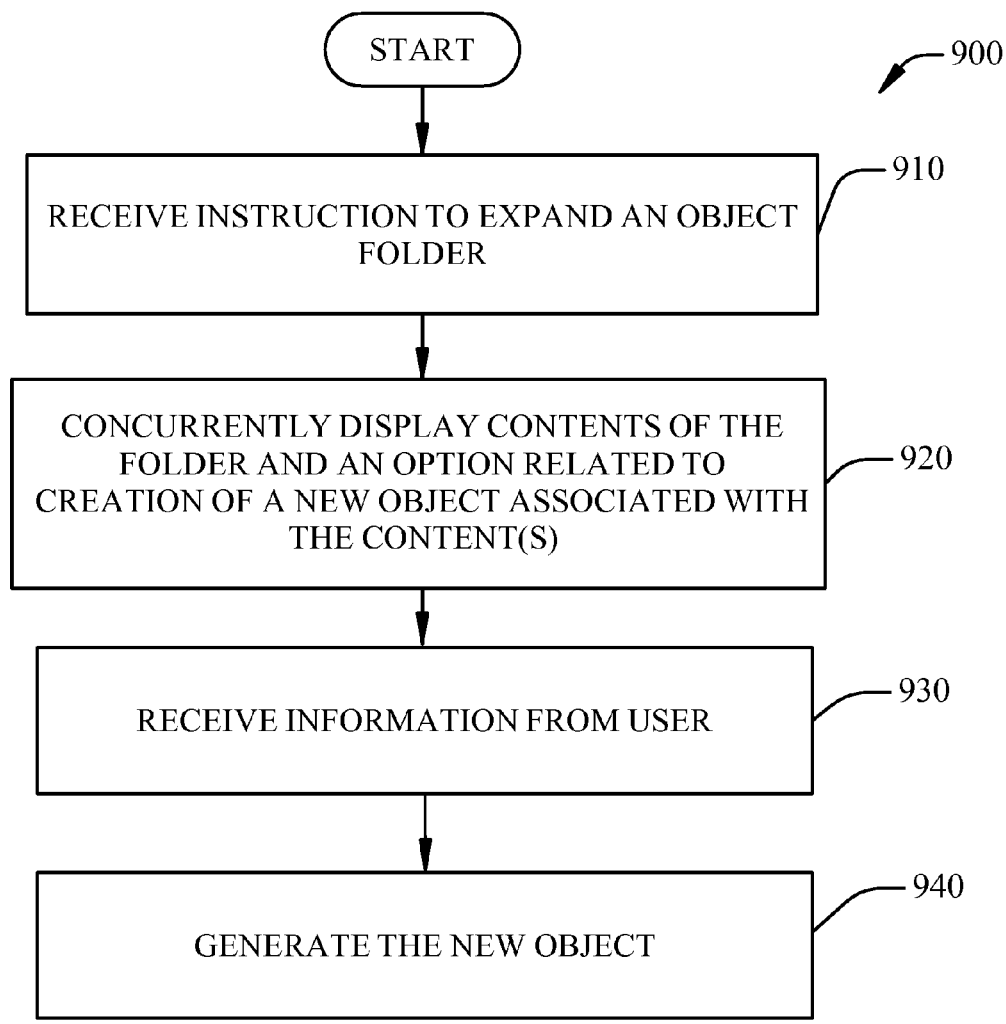
FIG. 9 is a flow diagram of a method that facilitates creation of a new object in an object hierarchy in accordance with an aspect of the present invention.
Figure 10:
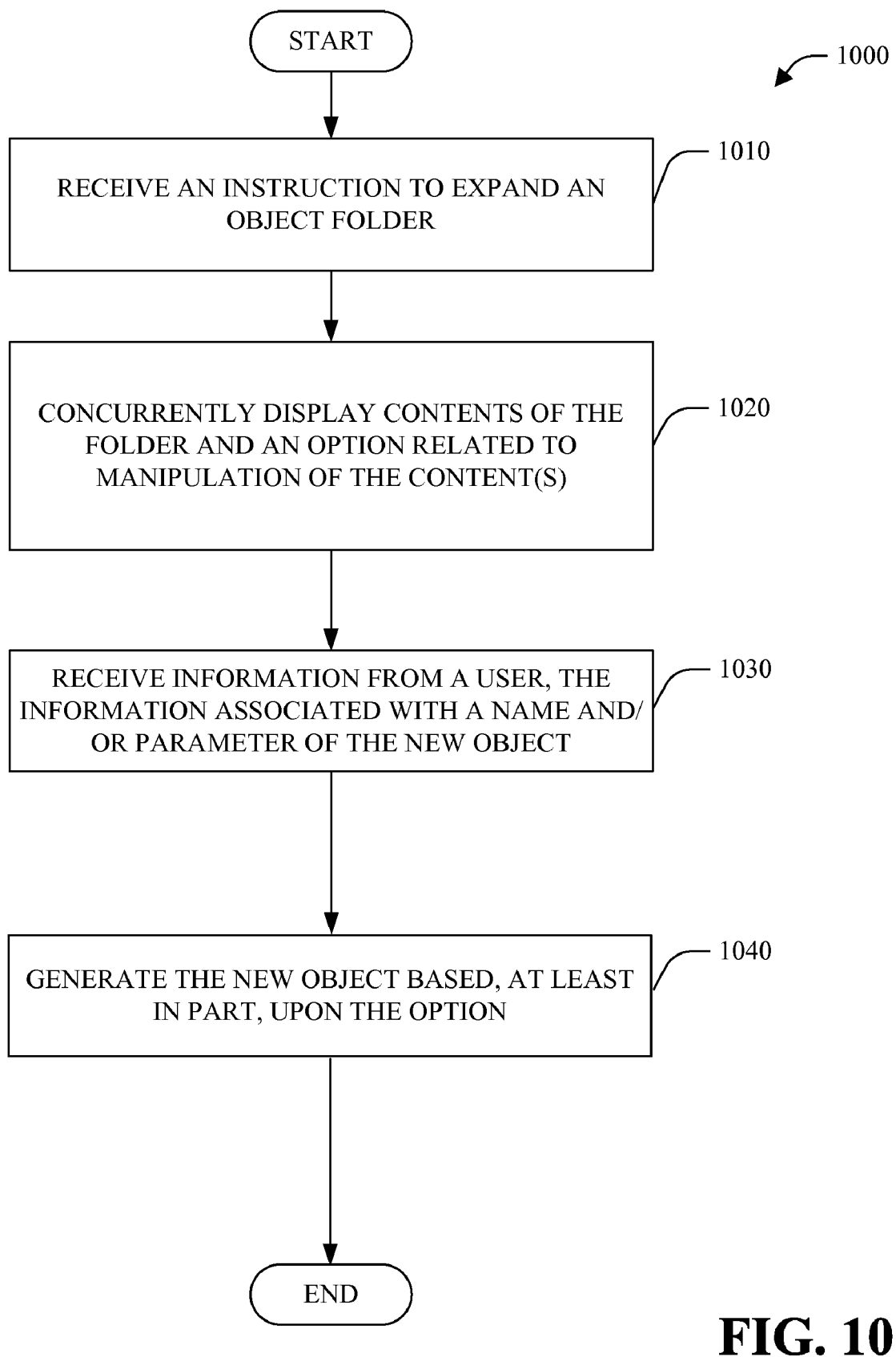
FIG. 10 is a flow diagram of a method that facilitates creation of new objects in an object hierarchy in accordance with an aspect of the present invention.
Figure 11:
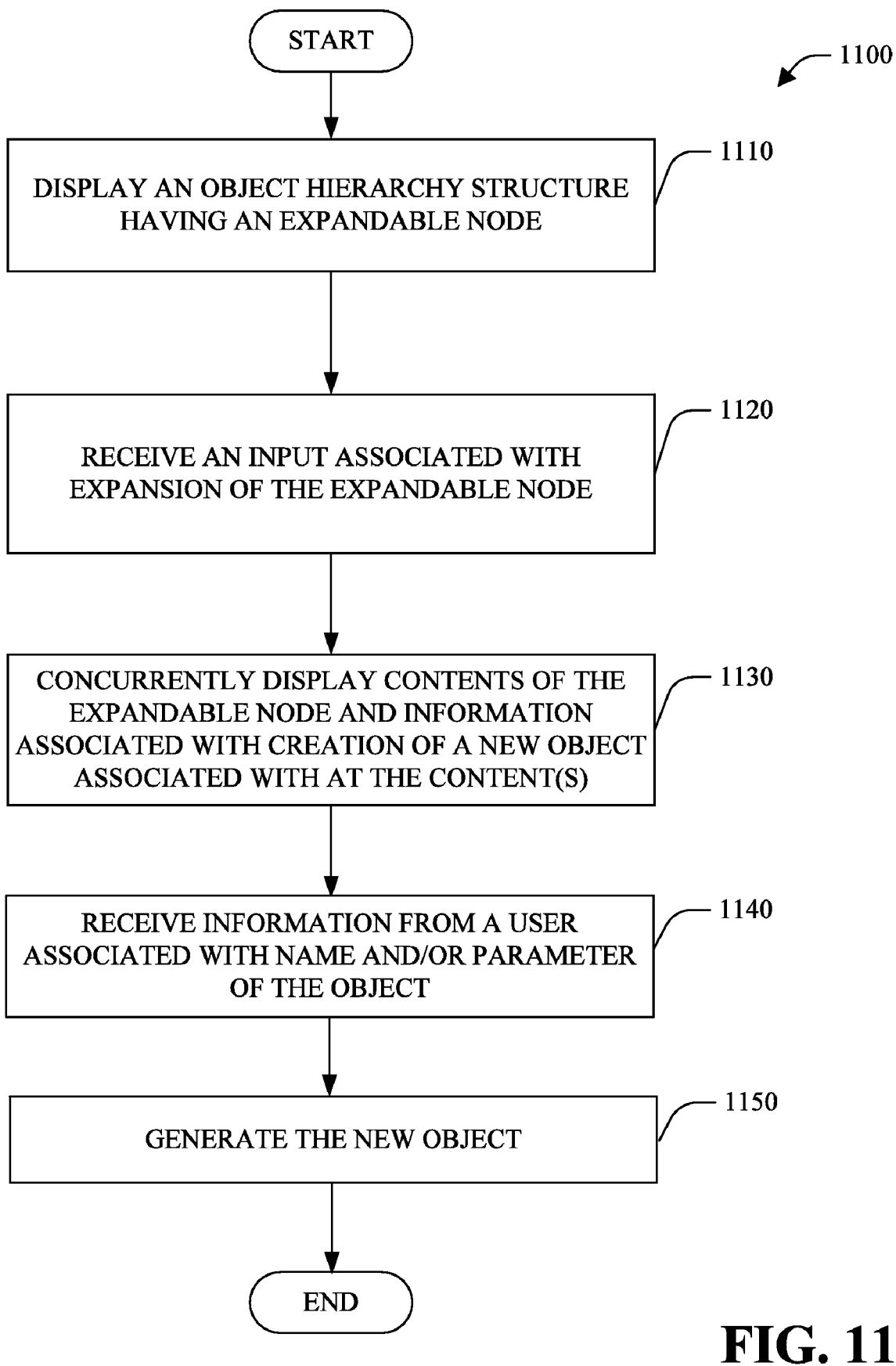
FIG. 11 is a flow diagram of a method that facilitates creation of new objects in an object hierarchy in accordance with an aspect of the present invention.

Turning briefly to FIGS. 9-11, methodologies that can be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 9, a method that facilitates creation of a new object in an object hierarchy 900 in accordance with an aspect of the present invention is illustrated. At 910, an instruction to expand an object folder is received by an input component. In one example, the input component receives the instruction to expand the object folder through a user, who can expand the object folder in any suitable manner (e.g. a pointer device, such as a computer mouse, a touch-sensitive screen, various keystrokes . . . ). In another example, the input component receives the instruction to expand the object folder though a computer program or other automated means. As shown at 920, once the object folder is expanded, contents of the folder and option(s) related to creation of an object associated with the content(s) are displayed concurrently. The contents of the folder can include one or more folders as well as objects of various types. For example, the folder can contain text documents, variables, bitmap images, etc., as well as initiator nodes, used to create objects of a designated type. The initiator nodes contained in the folder can be defined by the user, or alternatively an artificial intelligence technique can be employed to determine which initiator nodes reside in the folder. At 930, information is received from the user (e.g., object name and/or object parameter(s)). The computer receives the information from the user through an input component, which can utilize pop-up menus or pull-down menus in order to allow the user to enter information regarding the object in an intuitive manner. Alternatively, the user can enter information regarding the object by populating cells in the tree-grid which correspond to the object. At 940, the new object is generated. The generated object can reside in the same folder as the object initiator node, or alternatively the generated object can be directed to another folder.

Turning to FIG. 10, a method that facilitates creation of new objects in an object hierarchy 1000 in accordance with an aspect of the present invention is illustrated. At 1010, an instruction to expand an object folder is received. For example, the instruction to expand the object folder can received in the same manner as described in FIG. 9 at 910. At 1020, contents of the folder and option(s) related to manipulation of the content(s) are concurrently displayed. For example, the folder can contain a initiator node pre-designated to create variables to be used within a computer program. An option that allows a user to define the variable type can be concurrently displayed with the initiator node. At 1030, information (e.g., object name and/or object parameter(s)) is received from a user. At 1040, the new object is generated based, at least in part, upon the option. Therefore, in the above example the variable would be generated with a defined variable type (e.g., float, int . . . ).

Next, referring to FIG. 11, a method that facilitates creation of new objects in an object hierarchy 1100 in accordance with an aspect of the present invention is illustrated. At 1110, an object hierarchy having an expandable node is displayed. The display component utilized to display the object hierarchy is generally a computer monitor, although any monitor that can be used in connection with a computer can be utilized to display the object hierarchy. At 1120, an input associated with expansion of the expandable node is received. At 1130, contents of the expandable node and information associated with creation of a new object associated with the content(s) is concurrently displayed. At 1140, information associated with a name and/or parameter of the object is received from the user. The computer receives the information from the user through an input component, which can utilize pop-up menus or pull-down menus in order to allow the user to enter information regarding the object in an intuitive manner. Alternatively, the user can enter information regarding the object by populating cells in the tree-grid which correspond to the object. At 1150, the new object is generated.

Referring to FIGS. 12-25, exemplary user interfaces in accordance with aspect of the present invention are illustrated. FIGS. 12-25 illustrate process of creating a valid port object; however, it is to be appreciated that the present invention is not limited to creation of a valid port object.

Several features of the present invention are illustrated in FIGS. 12-25. First, an initiator node indicates the operation through instructional cues (such as the help text "<New port>" or just "<New>"). The operation acts upon the parent node. For example, the "Ports" node contains a child initiator node "<New port>" which can create a new port in the Ports folder.

Second, additional parameter(s) required to complete a sub-operation or the entire operation are collected in cells that are associated with the node. For example, to complete the entire "New port" operation, the user must (1) indicate that this is the operation to perform; (2) the user must provide a valid port name; and (3) the user must provide a valid port type. In one example, the user can enter in this information now. In another example, the user can opt to come back at a later time without losing any work done thus far.

Third, the cells have drop-down combo boxes or drop-down dialog boxes which provide options to the user for the particular parameter. The drop-down dialog boxes can be used to even help construct the parameter value.

Fourth, to indicate the status of the operation and provide next-step(s) guidance, a visual cue (such as the exclamation-point-in-the-triangle icon) will be shown from the time the operation initiates to the time the operation completes. The full operation, which can be composed of a number of sub-operations, can occur in stages as the user submits values, or can occur all at once, for example, after the last parameter value is supplied. The validation of parameter values may occur at any time and any number of times throughout this process. Hovering over the visual cue will display a tooltip which provides important guidance to the user for the next step. The exclamation point cue disappears once the operation has completed successfully.

Thus, in a sense, the present invention can serve as a dynamic modeless wizard that is in-line within an object hierarchy: a "wizard" in the sense that it is a process that is initiated, guides the user and collects data for the operation, executes zero or more sub-operations (work items), and has a finish point; "modeless" in that the user can modify one parameter value but not the others and come back at a later time; "dynamic" in that the steps to take (e.g., the work items to perform) to complete the entire operation are automatically generated; "in-line" in that you don't have to do any context switching to some other user interface like a separate dialog box or nearby modeless tool window.

Figure 12:
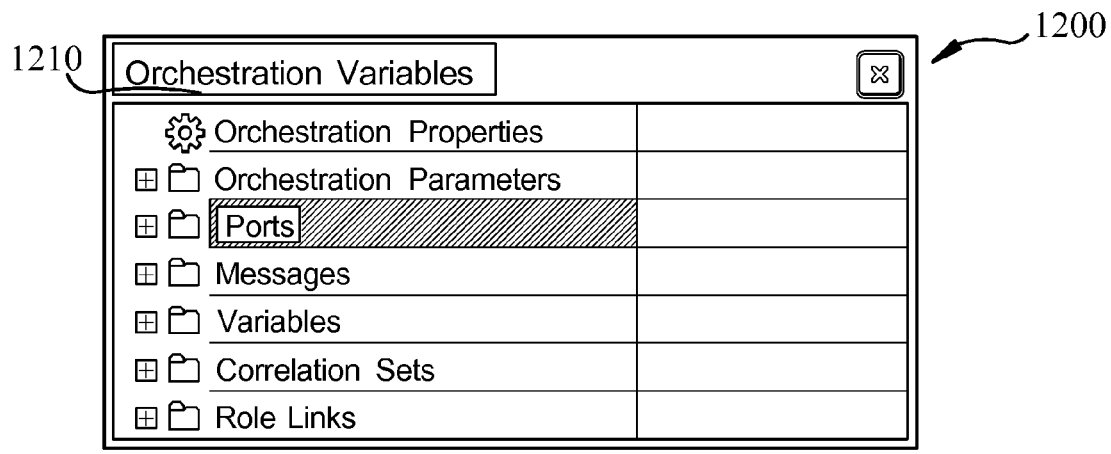
FIG. 12 is an exemplary user interface in accordance with an aspect of the present invention.

Turning to FIG. 12, an exemplary user interface 1200 in accordance with an aspect of the present invention is illustrated. The user interface 1200 illustrates an unexpanded hierarchy in which a Ports node 1210 is collapsed. For example, the Ports node 1210 can be a logical grouping of existing ports.

Figure 13:
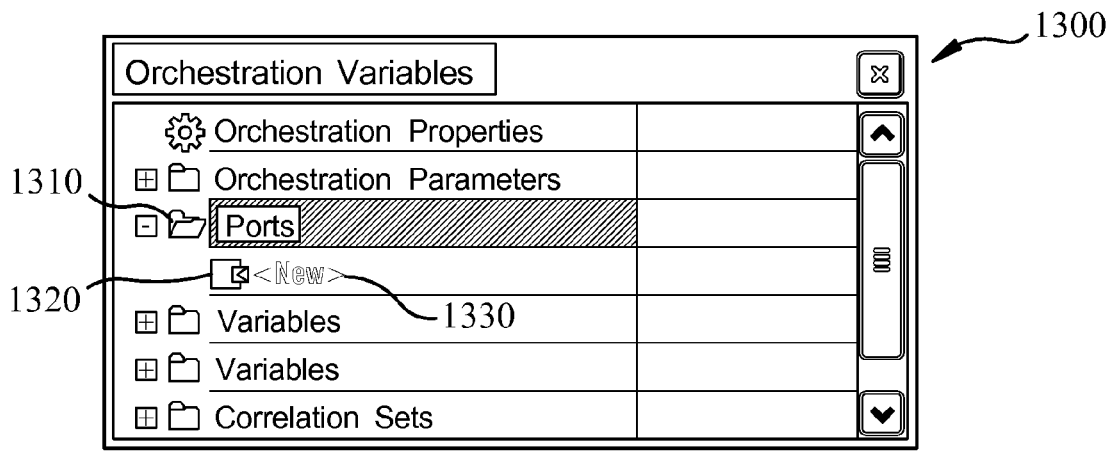
FIG. 13 is an exemplary user interface in accordance with an aspect of the present invention.

FIG. 13 illustrates an exemplary user interface 1300 in accordance with an aspect of the present invention. The user interface 1300 depicts an expanded Ports node 1310 in which a New Port initiator node 1320 appears, hinting to the user that the user can create a port by clicking there (e.g., with a mouse and/or pointing device). The user interface 1300 facilitates an intuitive process in which it is obvious to the user that the name of the port is to be typed in the same cell that help text 1330 appeared. In one example, the help text would remains even after the user clicked or otherwise navigated to the cell, and the help text would disappear when the user began to type.

Figure 14:
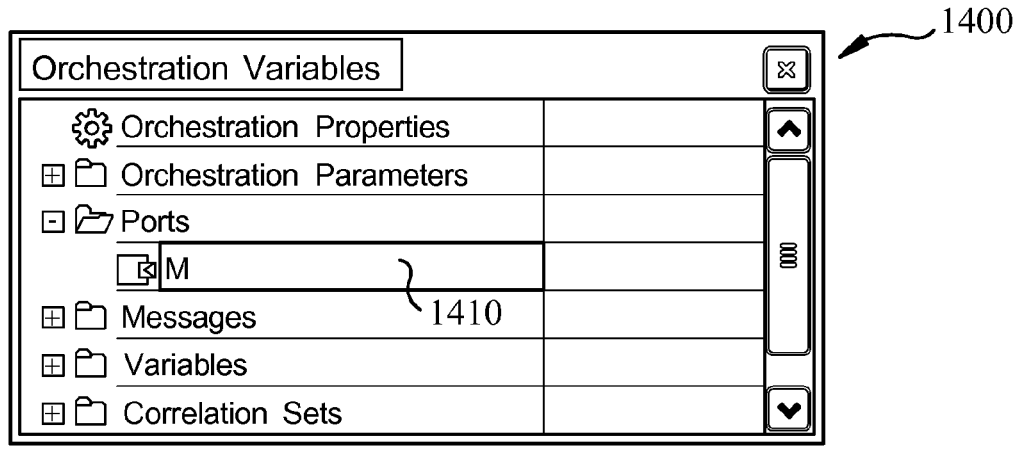
FIG. 14 is an exemplary user interface in accordance with an aspect of the present invention.

Referring to FIG. 14, an exemplary user interface 1400 in accordance with an aspect of the present invention. The user interface 1400 depicts a user initiated operation in which a New Port initiator node 1410 has been selected and initiated by typing the letter "M". For example, the user has indicated the user's desire to initiate the operation by navigating to the cell, and then initiated the operation by typing over the help text (e.g., help text 1330). In this example, the first parameter is the name of the port.

Figure 15:
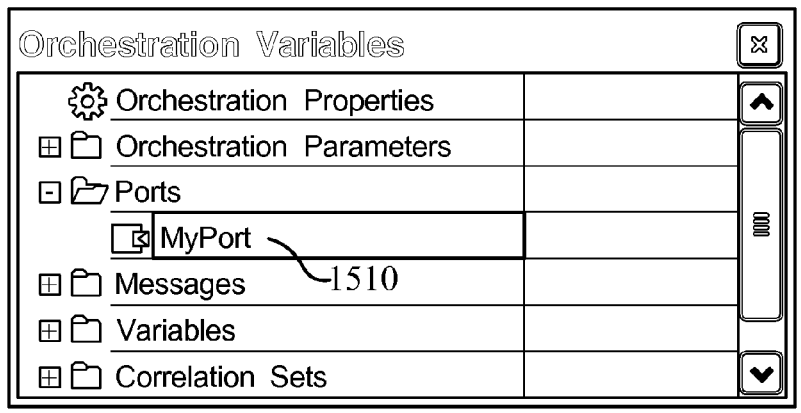
FIG. 15 is an exemplary user interface in accordance with an aspect of the present invention.

Turning briefly to FIG. 15 an exemplary user interface 1500 in accordance with an aspect of the present invention is illustrated. The user interface 1500 includes a New Port initiator node 1510 employed to create a port named "MyPort".

Figure 16:
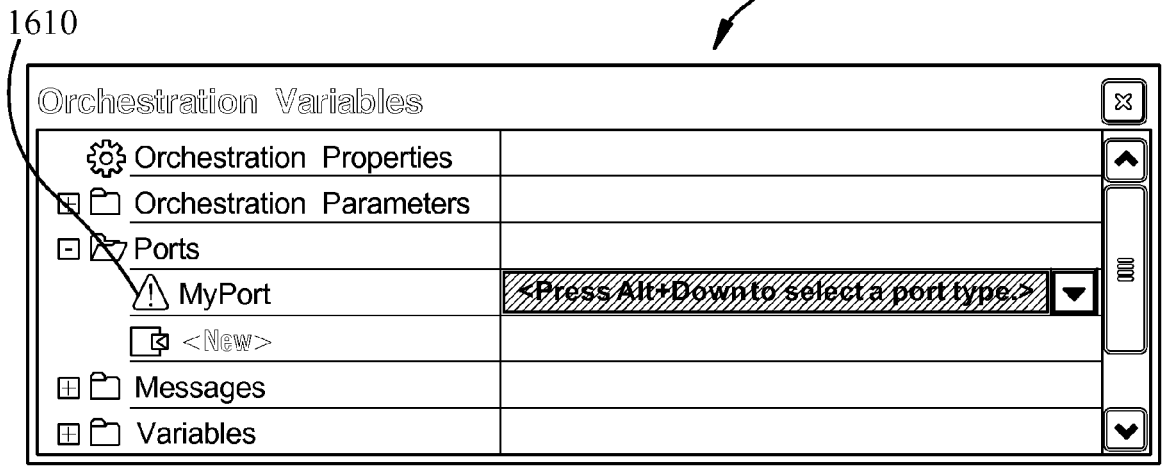
FIG. 16 is an exemplary user interface in accordance with an aspect of the present invention.

Turning to FIG. 16, an exemplary user interface 1600 in accordance with an aspect of the present invention is illustrated. Visual cues for status of operation and/or for guidance as to what to do next—in this case, an icon 1610 changes to an exclamation point indicating that the operation is not yet fully complete. By hovering over the exclamation point, a tooltip 1620 can appear indicating that the user is to enter the second parameter—which in this case is the port type in the adjacent cell. Typically, parameter values are entered in cells along the same row.

Figure 17:
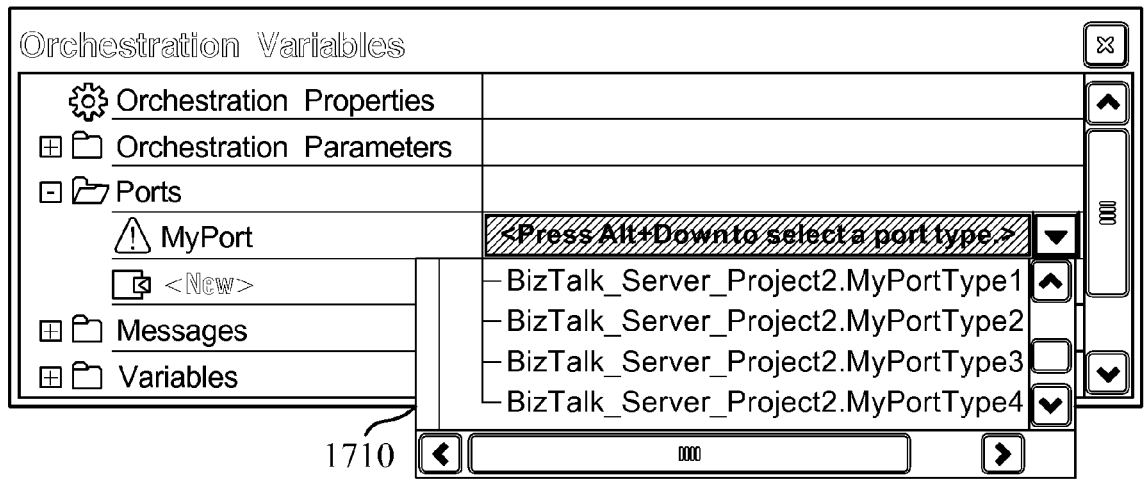
FIG. 17 is an exemplary user interface in accordance with an aspect of the present invention.

Referring to FIG. 17, an exemplary user interface 1700 in accordance with an aspect of the present invention is illustrated. In this example, the next cell can also provide help text 1710 to draw attention to itself and indicate what specific actions can be taken. The next cell demonstrates how options (for the parameter values) can be provided for the user—through a drop-down combo box.

Figure 18:
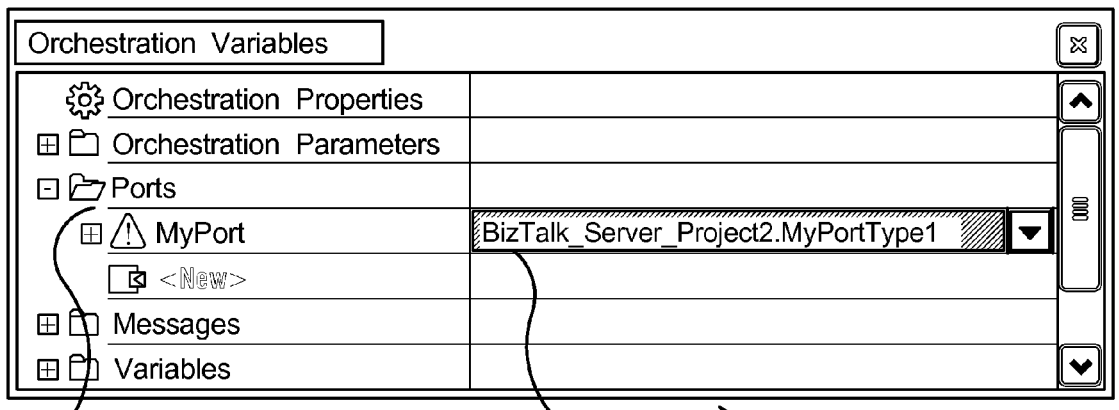
FIG. 18 is an exemplary user interface in accordance with an aspect of the present invention.

Next, referring to FIG. 18, an exemplary user interface 1800 in accordance with an aspect of the present invention is illustrated. In this example, acceptance of the parameter value has occurred. However, the operation is still not complete as indicated by a visual cue—an icon 1820 still shows an exclamation point. There is a sub-operation that still needs to be performed. For example, the user can, during this entire process, leave and come back later without losing work or without having to retrace steps.

Figure 19:
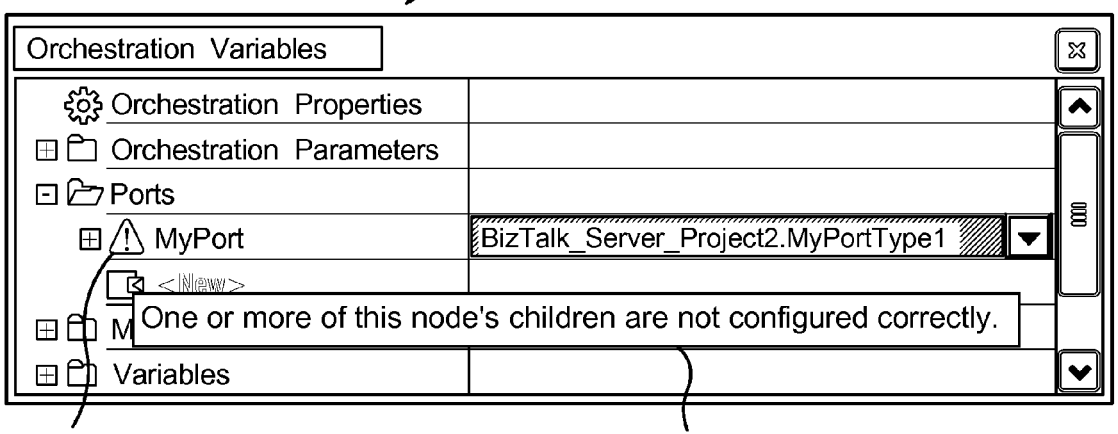
FIG. 19 is an exemplary user interface in accordance with an aspect of the present invention.
Figure 20:
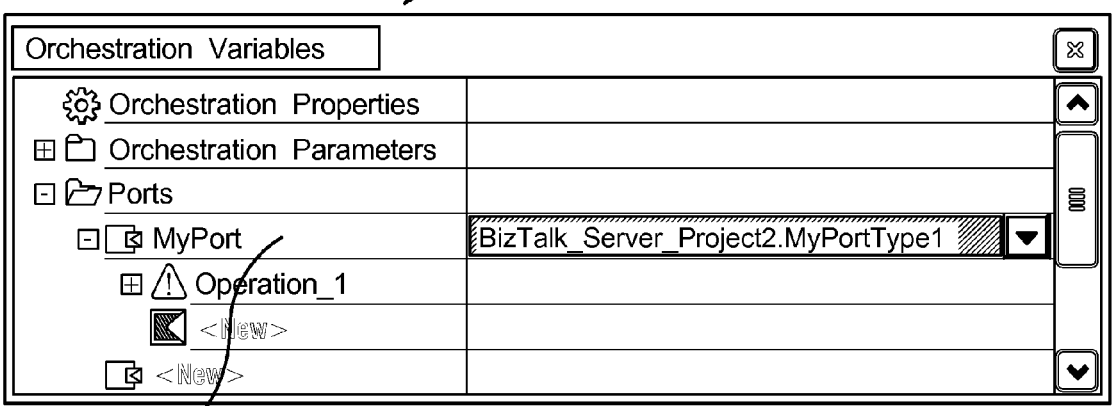
FIG. 20 is an exemplary user interface in accordance with an aspect of the present invention.

Turning to FIG. 19, an exemplary user interface 1900 in accordance with an aspect of the present invention is illustrated. In this example, by hovering over a visual cue, for example, an icon 1910, a tooltip 1920 is displayed which again provides status of the operation and guidance as to what to do next. In this case, it indicates that newly created child nodes have not yet been configured.

Figure 21:
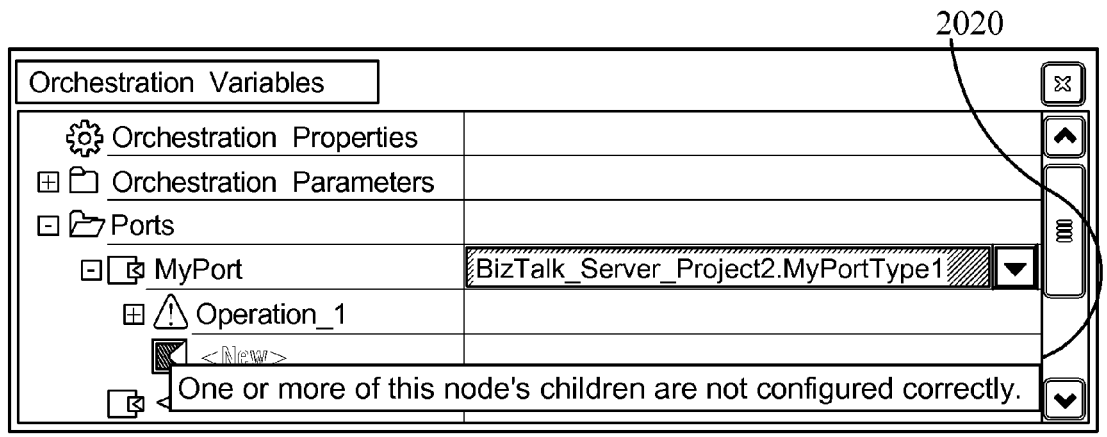
FIG. 21 is an exemplary user interface in accordance with an aspect of the present invention.
Figure 22:
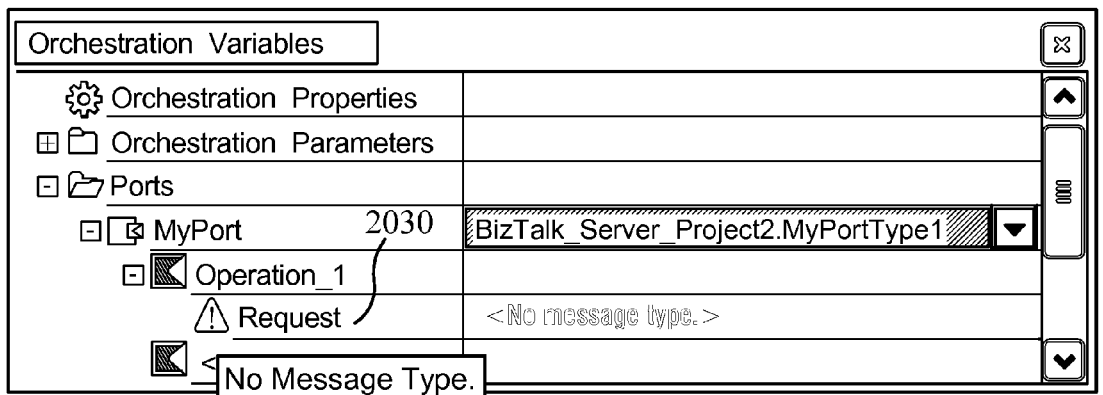
FIG. 22 is an exemplary user interface in accordance with an aspect of the present invention.
Figure 23:
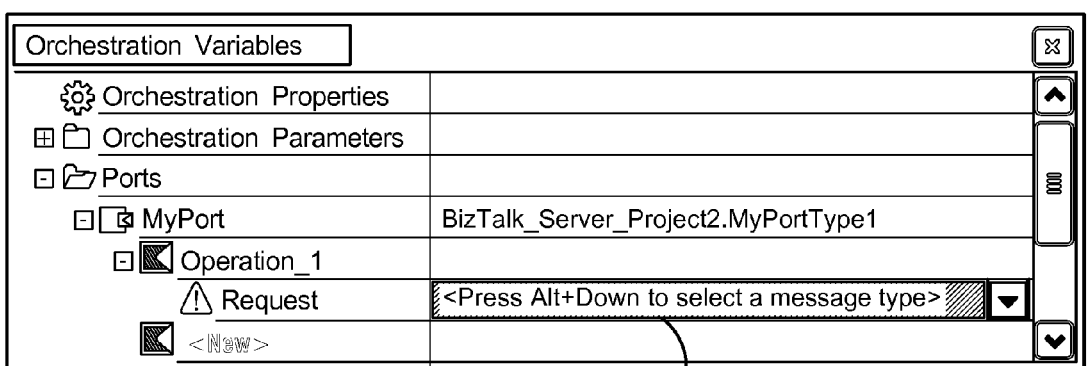
FIG. 23 is an exemplary user interface in accordance with an aspect of the present invention.

Referring to FIGS. 20-23, exemplary user interfaces 2000, 2100, 2200, 2300 in accordance aspects of the present invention are illustrated. In this example, a child node 2010 which needs to be configured is expanded. As illustrated in FIG. 21, to help direct the user, a visual cue 2020 is displayed which contains the next step to take. In this case, it is still a child node that needs configuring. Referring to FIG. 22, after expanding the child node, the node which needs attention, in this example, Request 2030, is displayed. A tooltip 2040 indicates that the user needs to provide a message type. Turning to FIG. 23, a drop-down combo box 2050 facilitates selection of a message type.

Figure 24:
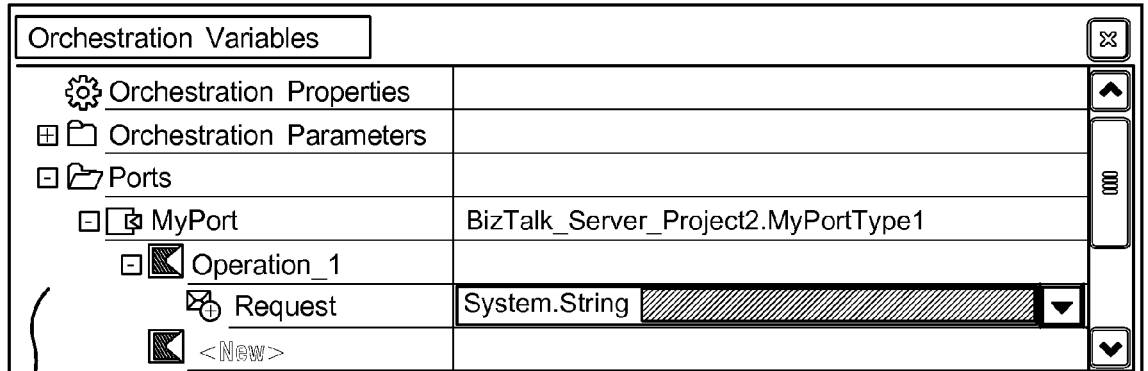
FIG. 24 is an exemplary user interface in accordance with an aspect of the present invention.

Next, referring to FIG. 24, an exemplary user interface 2400 in accordance with an aspect of the present invention is illustrated. The user interface 2400 indicates that the last sub-operation was performed successfully. The entire operation is now complete. A visual cue 2410 is updated to reflect the status of the entire operation.

Figure 25:
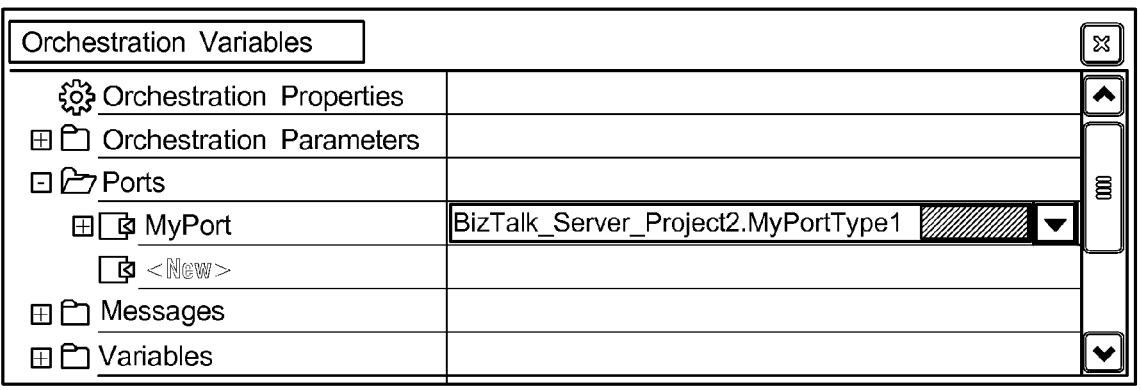
FIG. 25 is an exemplary user interface in accordance with an aspect of the present invention.

FIG. 25 illustrates an exemplary user interface 2500 in accordance with an aspect of the present invention. The user interface 2500 illustrates a successful completion of a port creation process.

It is to be appreciated that in accordance with an aspect of the present invention, a dynamic environment can be present. Accordingly, properties of various objects that have just been edited may change as a result of external agents, creating new work items. The visual cue (to indicate that work needs to be done) can automatically appear as work items need to be performed. Again, the visual cues will guide the user through the operation to complete it successfully.

Figure 26:
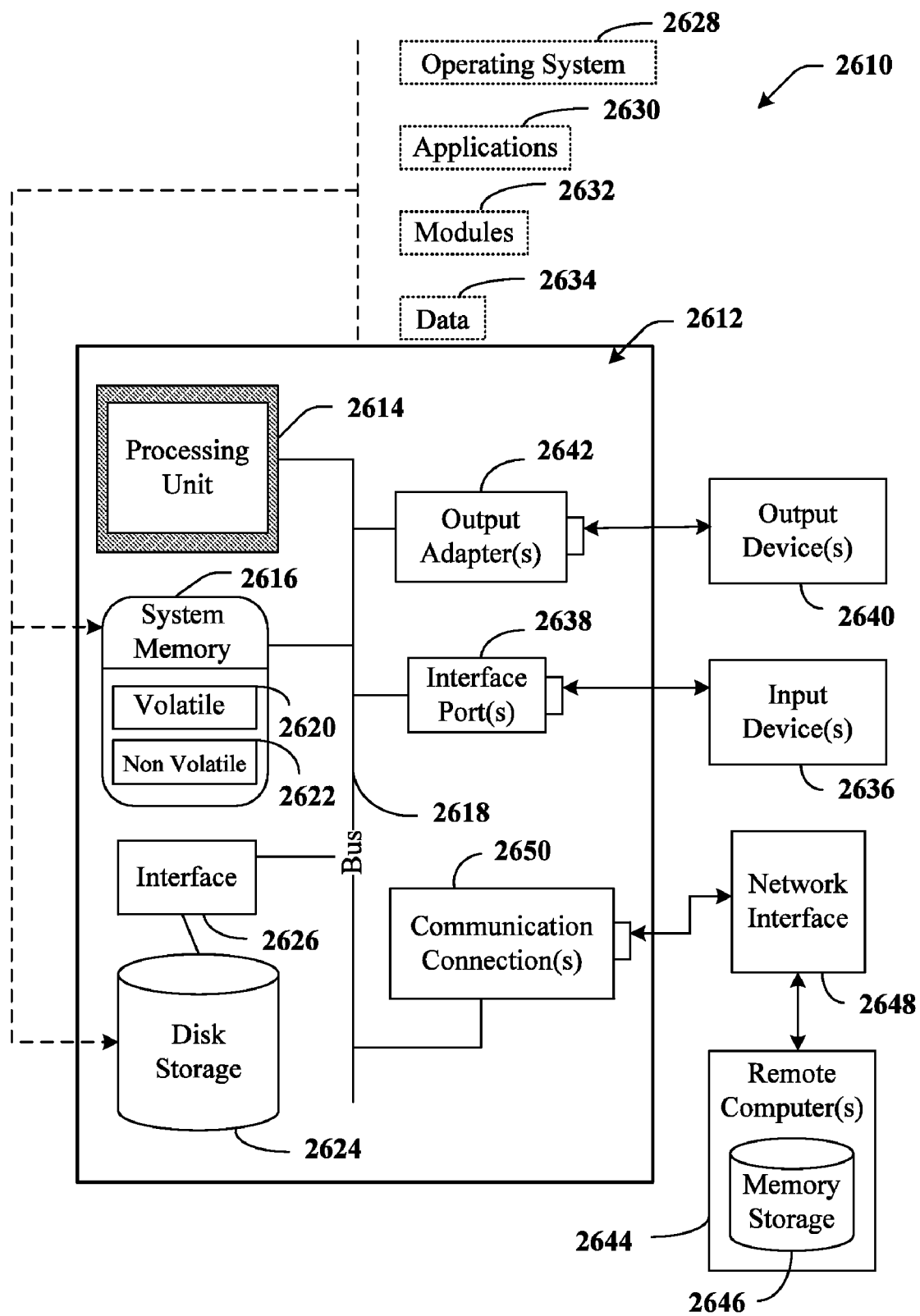
FIG. 26 illustrates an example operating environment in which the present invention may function.

In order to provide additional context for various aspects of the present invention, FIG. 26 and the following discussion are intended to provide a brief, general description of a suitable operating environment 2610 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 2610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 26, an exemplary environment 2610 for implementing various aspects of the invention includes a computer 2612. The computer 2612 includes a processing unit 2614, a system memory 2616, and a system bus 2618. The system bus 2618 couples system components including, but not limited to, the system memory 2616 to the processing unit 2614. The processing unit 2614 can be any of various available processors. Dual microprocessors and other multiprocessor architectures also can be employed as the processing unit 2614.

The system bus 2618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2616 includes volatile memory 2620 and nonvolatile memory 2622. The basic input/output system (BIOS), containing the basic routines to transfer information between elements within the computer 2612, such as during start-up, is stored in nonvolatile memory 2622. By way of illustration, and not limitation, nonvolatile memory 2622 can include read only memory (ROM), programmable ROM (PROM), electrically programmable ROM (EPROM), electrically erasable ROM (EEPROM), or flash memory. Volatile memory 2620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2612 also includes removable/nonremovable, volatile/nonvolatile computer storage media. FIG. 26 illustrates, for example a disk storage 2624. Disk storage 2624 includes, but is not limited to, devices like a magnetic disk drive, floppy disk drive, tape drive, Jaz drive, Zip drive, LS-100 drive, flash memory card, or memory stick. In addition, disk storage 2624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2624 to the system bus 2618, a removable or non-removable interface is typically used such as interface 2626.

It is to be appreciated that FIG. 26 describes software that acts as an intermediary between users and the basic computer resources described in suitable operating environment 2610. Such software includes an operating system 2628. Operating system 2628, which can be stored on disk storage 2624, acts to control and allocate resources of the computer system 2612. System applications 2630 take advantage of the management of resources by operating system 2628 through program modules 2632 and program data 2634 stored either in system memory 2616 or on disk storage 2624. It is to be appreciated that the present invention can be implemented with various operating systems or combinations of operating systems.

A user enters commands or information into the computer 2612 through input device(s) 2636. Input devices 2636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2614 through the system bus 2618 via interface port(s) 2638. Interface port(s) 2638 include, for example, a serial port, a parallel port, a game port, and a universal serial bus (USB). Output device(s) 2640 use some of the same type of ports as input device(s) 2636. Thus, for example, a USB port may be used to provide input to computer 2612, and to output information from computer 2612 to an output device 2640. Output adapter 2642 is provided to illustrate that there are some output devices 2640 like monitors, speakers, and printers among other output devices 2640 that require special adapters. The output adapters 2642 include, by way of illustration and not limitation, video and sound cards that provide a means of connection between the output device 2640 and the system bus 2618. It should be noted that other devices and/or systems of devices provide both input and output capabilities such as remote computer(s) 2644.

Computer 2612 can operate in a networked environment using logical connections to one or more remote computers, such as remote computer(s) 2644. The remote computer(s) 2644 can be a personal computer, a server, a router, a network PC, a workstation, a microprocessor based appliance, a peer device or other common network node and the like, and typically includes many or all of the elements described relative to computer 2612. For purposes of brevity, only a memory storage device 2646 is illustrated with remote computer(s) 2644. Remote computer(s) 2644 is logically connected to computer 2612 through a network interface 2648 and then physically connected via communication connection 2650. Network interface 2648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2650 refers to the hardware/software employed to connect the network interface 2648 to the bus 2618. While communication connection 1550 is shown for illustrative clarity inside computer 2612, it can also be external to computer 2612. The hardware/software necessary for connection to the network interface 2648 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system employing a user interface facilitating an inline modeless wizard comprising:

one or more processor; and memory storing computer-executable instructions which, when executed by the one or more processor, implement a method for facilitating the inline modeless wizard, wherein the method comprises:

displaying an object hierarchy structure having one or more expandable nodes;

receiving user input indicating that one of the expandable nodes is to be expanded;

displaying at least an initiator node upon expansion of the one of the expandable nodes, wherein the initiator node is displayed hierarchically beneath the one of the expandable nodes, wherein the initiator node is configured to facilitate creation of one or more new objects within the object hierarchy structure, wherein the initiator node includes a visual indication of an object type that will be created upon selection of the initiator node and wherein the object type is based at least in part on a context of the initiator node within the object hierarchy structure;

receiving user input indicating that a create operation is to be initiated using the initiator node to create a new object of the object type;

displaying the new object of the object type within the object hierarchy structure along with one or more user interface elements that are displayed with the new object and that indicate that one or more parameters associated with the new object are to be entered, wherein the one or more parameters are based at least in part on the object type of the new object; and displaying one or more visual cues that indicate that the create operation has been initiated but that the create operation is not yet fully complete, the one or more visual cues displayed contextually along with each of the one or more parameters to guide user input to assign one or more valid values for each of the one or more parameters to complete the create operation.

2. A system employing the user interface of claim 1, wherein a state of the create operation is persisted.

3. A system employing the user interface of claim 1, wherein an action external to the initiator node can at a later time alter a state of the wizard and update the one or more visual cues.

4. A system of claim 3, comprising one or more new work items created in the object hierarchy by the external action altering the state of the wizard.

5. A computer-implemented method for facilitating an in-line modeless wizard comprising:

a computing system displaying an object hierarchy structure having one or more expandable nodes, the computing system including one or more processor and a memory storing computer-executable instructions which, when executed by the one or more processor, implement the method;

the computing system receiving user input indicating that one of the expandable nodes is to be expanded;

the computing system displaying at least an initiator node upon expansion of the one of the expandable nodes, wherein the initiator node is displayed hierarchically beneath the one of the expandable nodes, wherein the initiator node is configured to facilitate creation of one or more new objects within the object hierarchy structure, wherein the initiator node includes a visual indication of an object type that will be created upon selection of the initiator node and wherein the object type is based at least in part on a context of the initiator node within the object hierarchy structure;

the computing system receiving user input indicating that a create operation is to be initiated using the initiator node to create a new object of the object type;

the computing system displaying the new object of the object type within the object hierarchy structure along with one or more user interface elements that are displayed with the new object and that indicate that one or more parameters associated with the new object are to be entered, wherein the one or more parameters are based at least in part on the object type of the new object; and the computing system displaying one or more visual cues that indicate that the create operation has been initiated but has not fully completed, the one or more visual cues displayed contextually along with at least one of the one or more parameters to guide user input to assign one or more valid values for the least one of the one or more parameters, operation.

6. The method of claim 5, facilitating creation of the new object comprises generating a creator node within the expanded node wherein the creator node has functionality based on the expanded node.

7. The method of claim 5, wherein the parameter information is received simultaneously upon the creation of the new object.

8. The method of claim 5, wherein a state of the create operation is persisted.

9. The method of claim 8, wherein the create operation is associated with characterizing the newly created object by receiving the parameter information.

10. The method of claim 8, the persisted state is associated with the newly created object which is incompletely characterized by receiving partial parameter information during creation of the new object wherein the persistence of the state facilitates receiving complete parameter information at a later time subsequent to the creation of the new object.

11. The method of claim 5, further comprising updating the user with a visual cue when an action external to the operation alters a state of the wizard after the creation of the new object.

12. The method of claim 11, comprising creating one or more new work items in the object hierarchy upon the external action altering the state of the wizard.

13. The method of claim 5, further comprising providing a visual cue to the user regarding a next step in the creation of the new object.

14. The method of claim 5, providing a user with an option for deactivating the creation of the new object for one or more expandable nodes upon generation of one or more child nodes of the expandable nodes.

15. A computer readable storage medium having stored thereon instructions for implementing an in-line dynamic modeless wizard that facilitates creation of objects within a hierarchy structure, comprising:

displaying an object hierarchy structure having one or more expandable nodes;

receiving user input indicating that one of the expandable nodes is to be expanded;

displaying at least an initiator node upon expansion of the one of the expandable nodes, wherein the initiator node is displayed hierarchically beneath the one of the expandable nodes, wherein the initiator node is configured to facilitate creation of one or more new objects within the object hierarchy structure, wherein the initiator node includes a visual indication of an object type that will be created upon selection of the initiator node and wherein the object type is based at least in part on a context of the initiator node within the object hierarchy structure;

receiving user input indicating that a create operation is to be initiated using the initiator node to create a new object of the object type;

displaying the new object of the object type within the object hierarchy structure along with one or more user interface elements that are displayed with the new object and that indicate that one or more parameters associated with the new object are to be entered, wherein the one or more parameters are based at least in part on the object type of the new object; and displaying one or more visual cues that indicate that the create operation is in progress, the one or more visual cues displayed contextually along with each of the one or more parameters to guide user input to assign one or more valid values for each of the one or more parameters and to thereby guide the user input to complete the create operation.

16. The medium of claim 15, comprising instructions for customizing functionality of a creator node based on a specific expandable node within which the creator node is generated.

17. The medium of claim 16, the functionality of the creator node is based on one or more of level of the creator node in the object hierarchy, proximity of the creator node to the expandable node or relationship of the creator node with the expandable node.

18. The medium of claim 15, comprising instructions for creating one or more of the new objects in one or more sub-operations as the user submits values for the one or more parameters.

19. The medium of claim 15, comprising instructions for creation of at least one of the new objects in a single operation that occurs upon the user submitting a value to a last parameter of one or more parameters associated with the new object being created.

20. The medium of claim 15, further comprising instructions to retard the display of a creator node within an expandable node upon generation of one or more new objects within the object hierarchy structure.

21. The medium of claim 15, wherein the one or more user interface elements are displayed adjacently in-line with the new object.

22. The medium of claim 15, the one or more visual cues being removed when each of the one or more parameters is assigned the one or more valid values and the create operation completes.

23. The medium of claim 15, the one or more visual cues guiding user input to assign the one or more valid values for each of the one or more parameters comprising displaying help text in connection with the one or more visual cues which informs a user how to provide valid user input to validate the new object.

* * * * *